United States Patent
Steinbrecher

(10) Patent No.: US 12,285,304 B2
(45) Date of Patent: Apr. 29, 2025

(54) TESTING MODEL FOR TESTING FITTING OF A DENTAL RESTORATION

(71) Applicant: EXOCAD GMBH, Darmstadt (DE)

(72) Inventor: Tillmann Steinbrecher, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 17 days.

(21) Appl. No.: 17/668,438

(22) Filed: Feb. 10, 2022

(65) Prior Publication Data

US 2023/0248487 A1    Aug. 10, 2023

(51) Int. Cl.
*A61C 5/77*        (2017.01)
*A61C 13/00*       (2006.01)

(52) U.S. Cl.
CPC ............ *A61C 13/0004* (2013.01); *A61C 5/77* (2017.02); *A61C 13/0006* (2013.01)

(58) Field of Classification Search
CPC ... A61C 13/0004; A61C 5/77; A61C 13/0006; A61C 13/34; Y10T 428/12229
USPC .............................................. 428/216, 542.8
See application file for complete search history.

(56) References Cited

U.S. PATENT DOCUMENTS

| | | | | |
|---|---|---|---|---|
| 5,342,201 A | * | 8/1994 | Oden ..................... | A61C 5/20 433/223 |
| 8,401,690 B2 | * | 3/2013 | Gleditzsch ......... | A61C 13/0022 433/201.1 |
| 2005/0008887 A1 | * | 1/2005 | Haymann ................. | A61C 5/77 428/542.8 |
| 2005/0261795 A1 | * | 11/2005 | Ghosh ................... | C04B 35/638 700/118 |
| 2006/0204932 A1 | * | 9/2006 | Haymann .......... | A61C 13/0022 433/201.1 |
| 2013/0341812 A1 | * | 12/2013 | Schechner .............. | C04B 41/85 264/17 |
| 2015/0111172 A1 | * | 4/2015 | Jung ........................ | A61C 5/77 433/172 |
| 2022/0079716 A1 | * | 3/2022 | Nikolskiy .............. | A61C 9/004 |

FOREIGN PATENT DOCUMENTS

| | | |
|---|---|---|
| EP | 1992302 A1 | 11/2008 |
| WO | WO-2018102862 A1 | 6/2018 |
| WO | WO-2020161245 A1 | 8/2020 |
| WO | WO-2022016294 A1 * | 1/2022 |

* cited by examiner

*Primary Examiner* — Cris L. Rodriguez
*Assistant Examiner* — Luis Ruiz Martin
(74) *Attorney, Agent, or Firm* — PERRY + CURRIER INC

(57) ABSTRACT

The invention relates to a method for providing a physical testing model for testing a fitting of a dental restoration to be hardened before the dental restoration being hardened. The dental restoration is required to fit onto a dental element after being hardened. The method comprises providing a 3D digital model of the dental element. Size of the 3D digital model of the dental element is scaled using a first scaling factor. The first scaling factor depends on an inverse of a second scaling factor quantifying a predicted scaling of the size of the dental restoration to be hardened due to the hardening. The scaling of the 3D digital model of the dental element results in a 3D digital testing model for the testing of the fitting of the dental restoration to be hardened. The 3D digital testing model is provided as a template for manufacturing the physical testing model.

26 Claims, 16 Drawing Sheets

TESTING MODEL FOR TESTING FITTING OF A DENTAL RESTORATION

The invention relates to the field of dental technology. More particularly, the invention relates to a method for providing a physical testing model for testing a fitting of a dental restoration. The invention furthermore relates to a computer device and a computer program product for providing a physical testing model for testing a fitting of a dental restoration as well as to a manufacturing system comprising the computer device. Furthermore, the invention relates to a physical testing model for testing a fitting of a dental restoration.

Dental restorations, like crowns, are usually arranged on dental elements, like prepared teeth or abutments. In order to ensure a stable support by a dental restoration and a long-lasting anchoring of the dental restoration, a precise fitting of the dental restoration onto the respective dental element is required. In case of imprecisions and deficiencies of the fitting an adjustment of the dental restoration may be required. However, in order to ensure a long-life cycle for the dental restoration, dental restorations are generally from a restoration material with a high degree of hardness. Thus, an adjustment of a dental restoration required in order to ensure a precise fitting onto a dental element may be challenging.

It is an objective to provide for a method, a computer device and computer program product for providing a physical testing model for testing a fitting of a dental restoration. Furthermore, it is an objective to provide for a manufacturing system for manufacturing a physical testing model for testing a fitting of a dental restoration. It is a further objective to provide for a physical testing model for testing a fitting of a dental restoration.

In one aspect, the invention relates to a method for providing a physical testing model for testing a fitting of a dental restoration to be hardened before the dental restoration being hardened. The dental restoration is required to fit onto a dental element after being hardened. The method comprises providing a 3D digital model of the dental element. Size of the 3D digital model of the dental element is scaled using a first scaling factor. The first scaling factor depends on an inverse of a second scaling factor quantifying a predicted scaling of the size of the dental restoration to be hardened due to the hardening. The scaling of the 3D digital model of the dental element results in a 3D digital testing model for the testing of the fitting of the dental restoration to be hardened. The 3D digital testing model is provided as a template for manufacturing the physical testing model.

Examples may have the beneficial effect, that 3D digital testing model is provided as a template for manufacturing a physical testing model for testing a fitting of a dental restoration to be hardened before the dental restoration being hardened.

Common dental restoration materials for dental restoration, such, e.g., as zirconium ceramics, are generally delivered in a pre-sintered state, in which they are softer and easier to machine compared to their post-sintered state. Machining, e.g., milling using CAM, may take place in this soft state.

Dental restorations, e.g., crowns, may be required to fit precisely onto a dental element, like an abutment or a tooth stump. Such dental restorations are often manufactured using materials, e.g., zirconium-bearing compounds, in a soft state such that they are easier to be shaped into a desired form, e.g., using milling. After a dental restoration with the desired shape has been manufactured, it has to be hardened, e.g., sintered, using a shape-preserving hardening process. Such hardening processes, in particular sintering, result in a change of the size of the dental restoration. For example, the dental restoration may shrink due to the hardening.

Thus, after manufacturing a dental restoration using a restoration material in a pre-sintered state, the dental restoration may, e.g., be sintered using a sintering furnace. During this sintering process, the dental restoration usually changes size. It shrinks during sintering. The scaling factor, i.e., shrinkage factor due to the sintering may, e.g., depend on the restoration material used to manufacture the dental restoration. Thus, manufacturing the dental restoration, e.g., using a CAM method, the dental restoration to be hardened may be manufactured larger than the intended final dental restoration after the hardening using the known shrinkage factor.

Providing a physical testing model, which is a scaled copy of the dental element on which the dental restoration is required to fit precisely, enable a physical testing of a fitting of a dental restoration on the dental element resembled by the physical testing model, before the hardening of the dental restoration. Before the hardening, the restoration material used for manufacturing the dental restoration may still be in a soft state allowing for adjustments of the fitting by adjusting the dental restoration. Testing a dental restoration before the hardening, may have the advantage that the dental restoration may still be modifiable with relative ease at this stage allowing for adjustments of the fitting by adjusting the dental restoration.

However, due to the scaling effect of the hardening process, the size of the dental restoration before hardening differs from the final size of the dental restoration after hardening. Using a physical testing model, which is a scaled copy of the dental element, this scaling effect may be taken into account. A physical testing model may be provided, with a geometric form and proportions identical to the geometric form and proportions of the actual dental element, on which the final dental restoration is to be arranged, but with a size scaled using the inverse of a scaling factor quantifying the scaling effect of the hardening process on the dental restoration.

For example, a hardening may result in a scaling of the dental restoration to be hardened by any of the following amounts: 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%. Thus, in case of a shrinking, the second scaling factor quantifying a predicted scaling of the size of the dental restoration to be hardened may be 0.98, 0.97, 0.96, 0.95, 0.94, 0.93, 0.92, 0.91, 0.90, 0.89, 0.88, 0.87, 0.86, 0.85, 0.84, 0.83, 0.82, 0.81, 0.80, 0.79, 0.78, 0.77, 0.76, 0.75, 0.74, 0.73, 0.72, 0.71, 0.70, respectively. In this case, the first scaling factor for scaling the 3D digital model of the dental may, e.g., be an inverse of the second scaling factor, i.e., 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, respectively.

For example, if it is known that the restoration material used for manufacturing the dental restoration, e.g., zirconium ceramic, will shrink to, e.g., 1/1.25 of the original size during sintering, the dental restoration to be hardened may be scaled by a factor of, e.g., 1.25. For example, a 3D digital testing model to be used as a template for manufacturing a physical testing model for testing a fitting of the scaled dental restoration may be scaled by a factor of, e.g., 1.25 as well. Thus, for generating the 3D digital testing model a 3D digital model of a dental element may be used, which is scaled by a factor of, e.g., 1.25.

By scaling the copy of the dental element, i.e., the physical testing model using a scaling factor, e.g., inverse to a scaling factor quantifying a scaling predicted for the hardening of the dental restoration, the physical testing model may provide a fitting for the dental restoration to be hardened, which corresponds to a fitting provided by the dental element for the hardened dental restoration. In case the fitting of the dental restoration to be hardened on the physical testing model is correct, it may be assumed that the fitting of the dental restoration after the hardening on the dental element may be correct as well. In case, an imprecision of the fitting is detected, the dental restoration may still be adjustable due to the soft state of the material used for manufacturing the dental restoration. After the adjusting, the adjusted dental restoration may be hardened.

After the hardening, it may be much difficult to adjust the dental restoration due to the harder state of the material used for manufacturing the dental restoration. A processing may be more challenging due to the harder state. It may be harder to remove material from the hardened dental restoration. Furthermore, the material used for manufacturing may be more brittle after the hardening than before the hardening. Thus, the risk of fractures due to stress resulting from the processing may be much higher after the hardening than before the hardening. Consequently, an adjusting of the dental restoration before the hardening may reduce the risk of fractures.

Thus, it may be avoided to test fitting after the hardening for the first time, when adjustments of the dental restoration are laborious and challenging. In particle, damages of the dental restoration, e.g., due to stress fractures, may be avoided. In case the dental restoration is damaged at that stage, the full manufacturing processes would have to be repeated in order to manufacture a new dental restoration. In case the dental restoration is damaged unexpectedly during an adjustment of the dental restoration before hardening, the hardening process would not have to be repeated in order to manufacture a new dental restoration.

Using a scaled copy of the dental element rather than the actual dental element or a true-to-scale copy of the dental element enables a physical testing of the fitting of the dental restoration before the hardening. The dental restoration is tested at a scale corresponding to the size of the dental restoration before the hardening, rather than testing the dental restoration at its final size after the hardening.

For example, a 3D digital model of the dental element is provided. The 3D digital model of the dental element may, e.g., be a digital copy of a physical dental element. For example, the 3D digital model of the dental element is generated using scan data of the dental element. The dental element may, e.g., be a natural dental element, like a prepared tooth or tooth stump, or an artificial dental element, like an abutment. For example, scan data from an optical scan may be used. The 3D digital model of the dental element may, e.g., be a digital template used to generate the dental element, which is a physical copy of the template. For example, in case of an abutment a 3D digital model of an abutment may be used as a template for manufacturing the respective abutment.

In order to generate the 3D digital testing model, the size of the 3D digital model of the dental element is scaled. The 3D digital model of the dental element is scaled using the inverse of a scaling caused by the hardening process. For example, the hardening may cause a shrinking of the size of the dental restoration. Thus, the 3D digital model of the dental element may, e.g., be scaled up in order to provide the 3D digital testing model.

The 3D digital testing model, i.e., the scaled 3D digital model may be used as template for manufacturing the physical testing model. The manufactured physical testing model may be a scaled copy of the dental element, onto which the dental restoration is required to fit. The manufactured physical testing model may be used for testing the dental restoration before being harden. Based on that test, the dental restoration may be adjusted to improve its fitting onto the testing model or maintained as it is in case of a precise fitting. Afterwards, the dental restoration may be hardened and may thus reach its final size. The hardened dental restoration may be arranged on the dental element. Since any imprecision of the fitting may already have been corrected during the testing with the physical testing model using by adjusting the dental restoration to be hardened, a precise fitting of the hardened dental restoration onto the dental emblement may be ensured. The hardened dental restoration may be bonded to the dental element using a bonding material, e.g., dental cement.

For example, the method further comprises manufacturing the physical testing model using the 3D digital testing model as a template. The manufactured physical testing model is a physical copy of the template.

Examples may have the beneficial effect, that a physical testing model is provided. The physical testing model may be used for physically testing a fitting of the dental restoration to be hardened before the dental restoration is hardened. The physical testing model may be a scaled copy of the dental element, on which the hardened dental restoration is required to fit. The scaling factor used for scaling the 3D digital model of the dental element in order to provide the 3D digital testing model may be an inverse of a second scaling factor quantifying the predicted scaling of the size of the dental restoration due to the hardening.

The scaling factor used for scaling the 3D digital model of the dental element in order to provide the 3D digital testing model may be an inverse of a second scaling factor quantifying, e.g., the predicted scaling of the size of the individual dental restoration due to the hardening. Thus, the physical testing model manufactured may, e.g., be a restoration-specific testing model. The second scaling factor may depend on the manufacturing material used for manufacturing the dental restoration.

For example, the second scaling factor may be specific for a charge of dental restorations. For example, the second scaling factor may be specific for a charge of blanks of manufacturing material used for manufacturing the respective dental restorations and thus specific for the dental restorations manufactured using the blanks from the respective charge. Furthermore, the second scaling factor may, e.g., depend on the form of the dental restoration and/or on the hardening process used to harden the dental restoration, e.g., on a type, equipment and/or one or more process parameter used for the hardening process For example, the physical testing model is manufactured using at least one of the following: machining, 3D printing, casting.

For example, the physical testing model may be manufactured using a machining device configured to manufacture the physical testing model by processing a blank. The resulting physical testing model may be configured for testing a fitting of a dental restoration before hardening of the respective dental restoration. For example, the physical testing model may be manufactured using a 3D printing device, i.e., a printer, configured to print the physical testing model. The resulting physical testing model may be configured for testing a fitting of a dental restoration before hardening of the respective dental restoration.

For example, the 3D digital testing model may be used as a positive to define a negative of the physical testing model in form of a negative 3D digital testing model. The negative 3D digital testing model may be used to manufacture, e.g., using machining or 3D printing, a casting matrix. The casting matrix may be configured for casting the physical testing model by inserting casting material into the casting matrix and curing the inserted casting material. The resulting physical testing model may be configured for testing a fitting of a dental restoration before hardening of the respective dental restoration.

For example, the dental element may be a natural dental element arranged in the patient's oral cavity, like a tooth or tooth stump prepared for receiving the dental restoration. The provided 3D digital model of the dental element may, e.g., be generated using scan data of the patient's oral cavity. For example, the respective dental element, like a prepared tooth or a prepared tooth stump, in the oral cavity may be scanned using a scanner, e.g., an optical scanner. The achieved scan data may be used to provide the 3D digital model of the dental element. Alternatively, an impression of the patient's dental element in the oral cavity, i.e., a negative imprint of the dental element, may be taken. Either this impression may be scanned, e.g., using an optical scanner, or the negative imprint provided by the impression may be used to generate a positive reproduction of the patient's dental element, i.e., a 3D physical model or cast of the dental element, which is scanned, e.g., by the optical scanner to provide the scan data used to generate the 3D digital model of the dental element.

For example, the dental element may be an artificial dental element, like an abutment. In case of a pre-manufactured artificial dental element, the provided 3D digital model of the dental element may, e.g., be generated using scan data of the pre-manufactured artificial dental element. For example, the artificial dental element may be manufactured using a computer-implemented method, e.g., comprising CAD/CAM techniques. The 3D digital model of the dental element provided may, e.g., be a 3D digital model of the dental element generated and provided as a template for manufacturing the artificial dental element. The artificial dental element may be manufactured in form of a physical element using the 3D digital model of the dental element as a template, i.e., the manufactured artificial dental element may be a physical copy of the template. The artificial dental element, e.g., an abutment, may be manufactured using at least one of the following: machining, 3D printing, casting.

For example, the method further comprises receiving a 3D digital tissue model of tissue in a patient's oral cavity. The 3D digital tissue model comprises the 3D digital model of the dental element.

Examples may have the beneficial effect, that the 3D digital model of the dental element may be provided as part of a 3D digital tissue model. The 3D digital model of the dental element may, e.g., be segmented and extracted from the 3D digital tissue model in order to generate the 3D digital testing model. The 3D digital tissue model may, e.g., comprise soft tissue, like a gingiva, in addition to hard tissue like teeth and the dental element. The 3D digital tissue model may, e.g., comprise a plurality of teeth of the patient, like a dental arch. The dental arch may, e.g., be a maxillary or a mandibular dental arch.

The 3D digital tissue model may, e.g., be generated using scan data of the patient's oral cavity. For example, tissue within the patient's oral cavity may be scanned using a scanner, e.g., an optical scanner. The tissue being scanned may comprise the dental element. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model.

For example, the method further comprises receiving a 3D digital tissue model and generating the 3D digital model of the dental element using the 3D digital tissue model.

Examples may have the beneficial effect, that the 3D digital model of the dental element may be generated using the 3D digital tissue model. For example, the 3D digital tissue model may be used as a basis for generating a dental element being arranged within the dentition of the patient at least partly resembled by the 3D digital tissue model. The 3D digital model of the dental element may be used as template for manufacturing the dental element as a physical copy of the template, rather than being a digital copy of an existing dental element.

For example, a tooth or tooth stump comprised by the 3D digital tissue model may be digitally prepared for receiving the dental preparation. A 3D digital model of the digitally prepared tooth or tooth stump, i.e., the 3D digital model of the dental element, may be used as a template for physically preparing the corresponding physical tooth or tooth stump in the oral cavity of the patient. For a digital preparation of a tooth or tooth stump, e.g., a minimum thickness required by a selected restoration material in order to ensure a sufficient stability of the dental restoration, a shape of the tooth or tooth stump to be prepared, a damage of the tooth or tooth stump to be prepared, and/or geometric features of a selected type of dental restoration may be taken into account. For a physical preparation of a tooth or tooth stump, e.g., a minimum thickness required by a selected restoration material in order to ensure a sufficient stability of the dental restoration, a shape of the tooth or tooth stump to be prepared, a damage of the tooth or tooth stump to be prepared, and/or geometric features of a selected type of dental restoration may be taken into account.

In case of a digital preparation, the tooth or tooth stump may, e.g., be rescanned after a physical preparation using the 3D digital model of the digitally prepared tooth or tooth stump, i.e., the 3D digital model of the dental element, as a template, in or to check, whether the physical preparation matches the digital preparation according the 3D digital model of the digitally prepared tooth or tooth stump. In case of discrepancies, either the tooth or tooth stump may be further prepared physically in order to match the 3D digital model of the digitally prepared tooth or tooth stump, or the 3D digital model of the digitally prepared tooth or tooth stump may be adjusted in order to match the actual physical preparation of the tooth or tooth stump.

The 3D digital tissue model may, e.g., be generated using scan data of the patient's oral cavity. For example, tissue within the patient's oral cavity may be scanned using a scanner, e.g., an optical scanner. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model.

For example, the method further comprises providing the dental restoration to be hardened. The fitting of the dental restoration to be hardened onto the physical testing model is tested. If the fitting violates one or more fitting criteria, the dental restoration to be hardened is adjusted in order to adjust the fitting onto the physical testing model and satisfy the one or more violated fitting criteria. The dental restoration to be hardened is hardened.

Examples may have the beneficial effect, that the physical testing model may be used for testing the physical dental restoration provided before hardening. Thus, the fitting may be tested before the dental restoration is hardened and corrected, if necessary, by adjusting the dental restoration. Since the testing and adjusting is performed before the hardening of the dental restoration, the manufacturing material used for manufacturing the dental restoration is softer than after the hardening. Thus, the dental restoration to be hardened may be easier adjusted with a reduced risk of damaging the dental restoration compared to the hardened dental restoration after execution of the hardening process.

For example, the method further comprises manufacturing the dental restoration to be hardened. The manufacturing comprises providing a 3D digital dental restoration model. Size of the 3D digital dental restoration model is scaled using the first scaling factor. The scaling of the 3D digital dental restoration model results in a template for manufacturing the dental restoration. The dental restoration is manufactured using the template for manufacturing the dental restoration. The manufactured dental restoration is a physical copy of the respective template.

Examples may have the beneficial effect, that the physical dental restoration to be hardened may be provided for testing using the physical testing model. The manufactured dental restoration is a physical copy of a scaled 3D digital dental restoration model. The scaled 3D digital dental restoration model is scaled with the inverse of the inverse of a scaling factor quantifying a predicted scaling of the dental restoration due to the hardening. Thus, the manufactured dental restoration after hardening may have the final size intended for the dental restoration. The hardened dental restoration may be a physical copy of the 3D digital dental restoration model before the scaling.

For example, the dental restoration is manufactured using at least one of the following: machining, 3D printing, casting.

For example, the dental restoration may be manufactured using a machining device configured to manufacture the dental restoration by processing a blank. The blank may comprise a material to be hardened, e.g., to be sintered. The resulting dental restoration has to be hardened. A fitting of the dental restoration to be hardened may be tested before hardening using the physical testing model. For example, the dental restoration may be manufactured using a 3D printing device, i.e., a printer, configured to print the dental restoration. The printing material used to print the dental restoration may comprise a material to be hardened, e.g., sintered. The resulting dental restoration has to be hardened. A fitting of the dental restoration to be hardened may be tested before hardening using the physical testing model.

For example, the dental restoration may be used as a positive to define a negative of the dental restoration in form of a negative scaled 3D digital dental restoration model. The negative scaled 3D digital dental restoration model may be used to manufacture, e.g., using machining or 3D printing, a casting matrix. The casting matrix may be configured for casting the dental restoration by inserting casting material into the casting matrix and curing the inserted casting material. The casting material used to cast the dental restoration may comprise a material to be hardened, e.g., sintered. The resulting dental restoration has to be hardened. A fitting of the dental restoration to be hardened may be tested before hardening using the physical testing model.

For example, the method further comprises generating the 3D digital dental restoration model using the 3D digital model of the dental element.

Examples may have the beneficial effect, that a 3D digital dental restoration model may be generated that is adjusted to fit onto the 3D digital model of the dental element. For example, the 3D digital model of the dental element may comprise a reception for receiving the 3D digital dental restoration model, when the 3D digital dental restoration model is arranged on the 3D digital model of the dental element. The 3D digital dental restoration model may be adjusted to fit into the reception of the 3D digital model of the dental element. For example, the 3D digital dental restoration model may comprise a reception for receiving the 3D digital model of the dental element, when the 3D digital dental restoration model is arranged on the 3D digital model of the dental element. The reception of the 3D digital dental restoration model may be adjusted such that the 3D digital model of the dental element fits into the reception.

For example, the method further comprises using the 3D digital tissue model for generating the 3D digital dental restoration model.

Examples may have the beneficial effect, that a 3D digital dental restoration model may be generated that fits to the dentition of the patient resembled at least partly by the 3D digital tissue model of the patient. For example, the 3D digital dental restoration model may be generated using a 3D digital model of a tooth or tooth stump to be restored, which is comprised by the 3D digital tissue model. For example, the 3D digital dental restoration model may be generated from scratch using the 3D digital model of a tooth or tooth stump to be restored, on which the dental restoration defined by the 3D digital dental restoration model is to be arranged. For example, the 3D digital dental restoration model may be generated using a 3D digital model of a neighboring tooth or an antagonist of the dental element, on which the dental restoration defined by the 3D digital dental restoration model is to be arranged. The 3D digital model of a neighboring tooth or an antagonist of the dental element may be used as a digital template for the dental restoration, which is adjusted, e.g., in shape and size to be used as the dental restoration. For example, the 3D digital dental restoration model may be selected from a library of dental restorations and adjusted, e.g., in shape and size to the individual anatomical and/or aesthetical requirements defined by the 3D digital tissue model.

For example, the first scaling factor is an inverse of the second scaling factor. Examples may have the beneficial effect, that the inverse of the second scaling factor quantifying the predicted scaling of the size of the dental restoration due to the hardening may be used to scale the 3D digital model of the dental.

For example, the first scaling factor is adjusted to result in a gap between the dental restoration to be hardened arranged on the physical testing model and the physical testing model. A thickness of the gap is configured for receiving a pressure sensitive material between the dental restoration to be hardened and the physical testing model. The pressure sensitive material is configured to indicate pressure points being used for determining sections of the dental restoration to be hardened requiring adjusting to improve the fitting of the dental restoration to be hardened onto the physical testing model.

Examples may have the beneficial effect, that using the pressure sensitive material sections of the dental restoration to be hardened may be identified, within which one or more pressure points are arranged. Such pressure points are points or sections at which an increased pressure occurs, when the dental restoration is arranged on the physical testing model. Thus, the pressure points indicate points or sections of an insufficient fitting of the dental restoration to be hardened on the physical testing model. In order to resolve these pressure points and to improve the fitting, the dental restoration to be hardened may be adjusted. By adjusting the dental restoration to be hardened, e.g., by removing material from sections of the dental restorations indicated by the pressure sensitive material to comprise pressure points, the local pressure resulting from the arranging of the dental restoration on the physical testing model may be reduced. Thus, the fitting of the dental restoration to be hardened may be improved.

For example, the pressure sensitive material may be arranged on the physical testing model and the dental restoration to be hardened may be arranged on the physical testing model with the pressure sensitive material. For example, the pressure sensitive material may be arranged at the dental restoration to hardened, e.g., within a reception of the dental restoration configured to receive the physical testing model, and the dental restoration to be hardened with the pressure sensitive material may be arranged on the physical testing model. For example, the physical testing model may be arranged within the reception of the dental restoration to be hardened.

Using the pressure sensitive material sections of the dental restoration to be hardened with an increased pressure relative to other sections of the dental restoration, when being arranged on the testing model may be identified. The position of the pressure points indicated by the pressure sensitive material may indicate the position of the sections of the dental restoration requiring adjustment in order to remove these pressure points and improve the fitting onto the physical testing model. The indicated sections of the dental restoration may be adjusted, e.g., by removing material. After the adjustment, the fitting may be tested again. For example, the pressure sensitive material may be replaced with new pressure sensitive material. In case the replaced pressure sensitive material indicates no pressure points with increased pressure on the dental restoration relative to other sections of the dental restoration, the fitting may be assessed to be correct. Otherwise, in case pressure points remain, the dental restoration may further be adjusted and the testing repeated until, the fitting is assessed to be correct.

The pressure sensitive material may be configured to indicate different levels of pressure. Pressure may be indicated by a change of color and/or a deformation of the pressure sensitive material. Thus, the pressure sensitive material may be configured to indicate pressure points, i.e., point with increased pressure relative to other sections of the pressure sensitive material.

The pressure sensitive material may, e.g., be provided in form of a pressure sensitive film. The pressure sensitive film may, e.g., comprise microcapsules with a dye, e.g., a colorless dye. Furthermore, the pressure sensitive film may further comprise a developer. When a defined pressure is exceeded, the microcapsules break and the released dye reacts chemically with the developer resulting in a generation of a color. The result may be a monochromatic dying of the pressure sensitive material with a variating shading of the monochromatic color indicating varying pressure levels. The film may, e.g., comprise a micro-encapsulated color layer and an adjacent color-developing layer. The microcapsules containing the dye may be adjusted to varying sizes and strengths. They may be coated uniformly onto the color-developing layer. A pressure induced breaking of the microcapsules may produce a color density that corresponds to the amount of pressure applied.

For example, the second scaling factor is a shrinking factor quantifying a predicted shrinking of the size of the dental restoration to be hardened due to the hardening.

Examples may have the beneficial effect, that the first scaling factor is the inverse of the shrinking factor, which quantifies the predicted shrinking of the size of the dental restoration to be hardened due to the hardening. Thus, the 3D digital testing model may be a scaled-up copy of the 3D digital model of the dental element. The scaling factor used to scale up the 3D digital model of the dental element may compensate a predicted shrinking of the size of the dental restoration due to be hardening.

The 3D digital testing model may, e.g., be scaled by the same scaling factor as the 3D digital dental restoration model. Thus, the resulting proportions between the physical testing model and the dental restoration to be hardened may be the same as the proportions between the dental element and the hardened dental restoration.

For example, the first scaling factor is larger by a compensation factor than the second scaling factor with the second scaling factor being a shrinking factor quantifying a predicted shrinking of the size of the dental restoration to be hardened due to the hardening. For example, the compensation factor may be chosen such that the first scaling factor is slightly larger than the second scaling factor. For example, the compensation factor may be chosen such that the 3D digital testing model relative to the 3D digital model of the dental element is scaled up by the inverse of the predicted shrinking due to the hardening plus a thickness of a layer of a bonding material, like dental cement, added on the 3D digital model of the dental element scaled up by the inverse of the predicted shrinking. Between the 3D digital model of the dental element and the 3D digital dental restoration model a gap may be provided for a layer of bonding material to be arranged between the dental element and the dental restoration in order to establish a bonding of the dental restoration on the dental element. The compensation factor may add such a layer on the scaled-up 3D digital model of the dental element such that no such gap for a bonding material remains between scaled 3D digital dental restoration model and the 3D digital testing model.

Alternatively, an additional layer of a paste may be added onto the physical testing model, when testing the fitting of the dental restoration to be hardened on the physical testing model. This additional layer may be used to simulate the bonding material to be added onto the dental element in order to bond the hardened dental restoration onto the dental element.

For example, the second scaling factor may be a shrinking factor quantifying a predicted shrinking of the total size of the dental restoration to be hardened due to the hardening. For example, the second scaling factor may be a shrinking factor quantifying a predicted shrinking of the size of a supporting section of the dental restoration to be hardened due to the hardening. The supporting section is a section of the dental restoration to be hardened, which is supported by the dental element in order to support the dental restoration, when the dental restoration is arranged on the dental element. The supporting section may further be configured for establishing a bonding of the dental restoration to the dental element. For the bonding a bonding material may be used in order to establishing a fixed connection between the dental restoration and the dental element. The supporting section may for example be provided by a reception of the dental restoration configured for receiving the dental element, when the dental restoration is arranged in the dental elements. The supporting section may for example be provided by a section of the dental restoration configured to be received by a reception of the dental element. The supporting section may for example be provided by a section of the dental restoration configured for being arranged on a section of the dental element.

For example, the second scaling factor is a restoration-specific scaling factor assigned to the individual dental restoration. The physical testing model is a restoration-specific physical testing model.

Examples may have the beneficial effect, that a restoration-specific physical testing model for testing a specific dental restoration is provided. Restoration-specific scaling factor may, e.g., depend on a restoration material used for manufacturing the dental restoration to be hardened. For example, the restoration-specific scaling factor may depend on a composition of the restoration material. For example, the restoration-specific scaling factor may be batch-specific scaling factor depend on a composition of a batch of the restoration material. The batch of the restoration material may be a batch of blanks of restoration material provided for manufacturing the dental restoration. The batch of the restoration material may be a batch of supply units with restoration material for 3D printer.

For example, the restoration-specific scaling factor may depend on a geometric form and/or on dimensions of the dental restoration to be hardened. For example, the restoration-specific scaling factor may depend on a material thickness of a restoration material used for manufacturing the dental restoration to be hardened.

For example, the hardening of the dental restoration comprises sintering.

Examples may have the beneficial effect, that the dental restoration may be hardened by sintering. Sintering refers to a process of compacting and forming a solid mass of material by heat and/or pressure without melting it to a point of liquefaction. Sintering may, e.g., be executed as part of a manufacturing process used with dental ceramics. The atoms and/or molecules in the material being sintered diffuse across boundaries of particles of the material resulting in a fusing of the particles and creating a solid piece. Since the sintering temperature is not required to reach a melting point of the material being sintered, sintering may be used as a shaping process for materials with high melting points.

The restoration material used for manufacturing the dental restoration to be hardened by sintering may, e.g., be a ceramic, e.g., a leucite-based ceramic, an alumina-based ceramic, lithium disilicate, composite reinforced ceramic or a zirconium-based ceramic.

The dental restoration may, e.g., be manufactured using CAD-CAM methods. The manufacturing of the dental restoration may, e.g., comprise a slip casting method.

For example, the method further comprises receiving the first scaling factor by one of the following: by receiving the first scaling factor as an input, by receiving the first scaling factor as a scan result provided by a scanner configured for scanning a code comprising the first scaling factor.

The code comprising the first scaling factor may, e.g., be an opto-electronically readable code. The scanner may, e.g., be an opto-electronic scanner, e.g., a camera, configured for reading the opto-electronically readable code. The opto-electronically readable code may e.g., be a one-dimensional or a two-dimensional code. A one-dimensional code may, e.g., be a linear bar code. A two-dimensional code may, e.g., be a 2D barcode or matrix code, like, e.g., a QR-code. The opto-electronically readable code may, e.g., be provided by an opto-electronically readable label.

The code comprising the first scaling factor may, e.g., be an electromagnetically transmitted code. For example, the code is transmitted by an RFID tag sending a radio-frequency signal comprising the code. The scanner may, e.g., be an electromagnetic scanner, like an RFID reader configured for receiving radio-frequency signals. The RFID tag may be configured to transmits digital data comprising the code via a radio-frequency signal, when being triggered by an electromagnetic interrogation pulse from the RFID reader. The RFID tag may, e.g., be a passive tag powered by energy from the RFID reader's interrogating radio waves or an active tag powered by a battery.

Examples may have the beneficial effect, that the first scaling factor may be received as an input. Examples may have the beneficial effect, that the first scaling factor may be received as a scan result provided by a scanner, e.g., an opto-electronic scanner or an RFID reader. The scanner may be used for scanning a code provided, e.g., on a blank for a machining device or on a supply unit with printing material for a 3D printer. The code may, e.g., be provided in form of an opto-electronically readable label or by an RFID tag. The code may comprise the first scaling factor.

For example, the method further comprises receiving the second scaling factor and calculating the first scaling factor using the second scaling factor. The second scaling factor is received by one of the following: by receiving the second scaling factor as an input, by receiving the second scaling factor as a scan result provided by a scanner configured for scanning a code comprising the second scaling factor.

The code comprising the second scaling factor may, e.g., be an opto-electronically readable code. The scanner may, e.g., be an opto-electronic scanner, e.g., a camera, configured for reading the opto-electronically readable code. The opto-electronically readable code may e.g., be a one-dimensional or a two-dimensional code. A one-dimensional code may, e.g., be a linear bar code. A two-dimensional code may, e.g., be a 2D barcode or matrix code, like, e.g., a QR-code. The opto-electronically readable code may, e.g., be provided by an opto-electronically readable label.

The code comprising the second scaling factor may, e.g., be an electromagnetically transmitted code. For example, the code is transmitted by an RFID tag sending a radio-frequency signal comprising the code. The scanner may, e.g., be an electromagnetic scanner, like an RFID reader configured for receiving radio-frequency signals. The RFID tag may be configured to transmits digital data comprising the code via a radio-frequency signal, when being triggered by an electromagnetic interrogation pulse from the RFID reader. The RFID tag may, e.g., be a passive tag powered by energy from the RFID reader's interrogating radio waves or an active tag powered by a battery.

Examples may have the beneficial effect, that the second scaling factor may be received as an input. Examples may have the beneficial effect, that the second scaling factor may be received as a scan result provided by a scanner, e.g., an opto-electronic scanner or an RFID reader. The scanner may be used for scanning a code provided, e.g., on a blank for a machining device or on a supply unit with printing material for a 3D printer. The code may, e.g., be provided in form of an opto-electronically readable label or by an RFID tag. The code may comprise the second scaling factor.

The calculating of the first scaling factor may, e.g., comprise inverting the second scaling factor.

For example, the method further comprises providing a first library of restoration materials. Each of the restoration materials is assigned with at least one of the following scaling factors: a restoration material specific first scaling factor, a restoration material specific second scaling factor. The method further comprises selecting one of the restoration materials to be used for manufacturing the dental restoration. A scaling factor assigned to the selected restoration material is used for scaling the 3D digital testing model.

Examples may have the beneficial effect, that the restoration materials to be used for manufacturing the dental restoration may be selected using the library of restoration material. In addition, the library may provide the first scaling factor for scaling the 3D digital model of the dental element in order to generate 3D digital testing model. Additionally or alternatively, the library may provide the second scaling factor quantifying a predicted scaling of the selected restoration material due to a hardening. The second scaling factor may, e.g., be used for calculating the first scaling factor for scaling the 3D digital model of the dental element in order to generate 3D digital testing model. The calculating of the first scaling factor may, e.g., comprise inverting the second scaling factor.

For example, the individual restoration materials each are assigned with a plurality of scaling factors. The scaling factors being assigned to the individual restoration materials are restoration type specific scaling factors. The method further comprises selecting in addition to one of the restoration materials a restoration type depending on the type of dental restoration for which the physical testing model is to be provided. The scaling factor used for scaling the 3D digital testing model is a scaling factor assigned to the selected restoration material and specific for the selected restoration type.

The scaling factor provided by the library may, e.g., be a first scaling factor for scaling the size of the 3D digital model of the dental element. Examples may have the beneficial effect, that the first scaling factor used for scaling the size of the 3D digital model of the dental element in order to generate the 3D digital testing model may not only depend on the restoration material, but also on the type of dental restoration for which the physical testing model is to be provided. For example, the scaling factor may depend on a geometric form of the dental restoration. For example, the scaling factor may depend on a geometric form of a support section of the dental restoration configured for being arranged on the dental element in order to support the dental restoration on the dental element.

The scaling factor provided by the library may, e.g., be a second scaling factor quantifying a predicted scaling of the size of the dental restoration to be hardened due to the hardening. The second scaling factor may, e.g., be used for calculating the first scaling factor for scaling the 3D digital model of the dental element in order to generate 3D digital testing model. The calculating of the first scaling factor may, e.g., comprise inverting the second scaling factor. Examples may have the beneficial effect, that the second scaling factor may not only depend on the restoration material, but also on the type of dental restoration for which the physical testing model is to be provided. For example, the scaling factor may depend on a geometric form of the dental restoration. For example, the scaling factor may depend on a geometric form of a support section of the dental restoration configured for being arranged on the dental element in order to support the dental restoration on the dental element.

The scaling of the dental restoration due to hardening may not occur uniformly throughout the dental restoration, but slight variations may occur. These variations may, e.g., depend on the geometric form of the dental restoration. The types of dental restoration may be classified according to their geometric features. Thus, a type of dental restoration may identify a type of geometry. The dependency of the variation on the geometric form may be determined by manufacturing different types of dental restorations with different geometries and determining differences in the variations of the scaling due to differences in the geometry.

Alternatively, the scaling factor used, i.e., the first and/or second scaling factor, may be an averaged scaling factor.

For example, the individual restoration materials each are assigned with a plurality of scaling factors. The scaling factors assigned to the individual restoration materials are hardening process specific scaling factors. The method further comprises selecting in addition to one of the restoration materials a hardening process to be used for hardening the dental restoration to hardened. The scaling factor used for scaling the 3D digital testing model is a scaling factor assigned to the selected restoration material and specific for the selected hardening process.

The hardening processes may, e.g., be characterized by the type of hardening process used for hardening the dental restoration to be hardened. The hardening process may, e.g., comprise sintering. Furthermore, the hardening process may be characterized by process parameters of the hardening process, like a temperature applied, a pressure applied, a duration of time, over which a specific temperature and/or pressure is applied.

The scaling factor provided by the library may, e.g., be a first scaling factor for scaling the size of the 3D digital model of the dental element. Examples may have the beneficial effect, that the first scaling factor used for scaling the size of the 3D digital model of the dental element in order to generate the 3D digital testing model may not only depend on the restoration material, but also on the hardening process used for the hardening.

The scaling factor provided by the library may, e.g., be a second scaling factor quantifying a predicted scaling of the size of the dental restoration to be hardened due to the hardening. The second scaling factor may, e.g., be used for calculating the first scaling factor for scaling the 3D digital model of the dental element in order to generate 3D digital testing model. The calculating of the first scaling factor may, e.g., comprise inverting the second scaling factor. Examples may have the beneficial effect, that the second scaling factor may not only depend on the restoration material, but also on the hardening process used for the hardening.

For example, the hardening process used may be a restoration material specific hardening process with process parameters prescribed for the respective restoration material, e.g., by a manufacturer of the restoration material.

For example, the method further comprises a second library of restoration types. Each of the restoration types is assigned with one or more adjustment parameters for a restoration type specific adjusting a first scaling factor. The method further comprises selecting one of the restoration types depending on the type of dental restoration for which the physical testing model is to be provided. The one or more adjustment parameters assigned to the restoration type is used for adjusting the first scaling factor used for scaling the 3D digital testing model to the type of dental restoration for which the physical testing model is to be provided.

Examples may have the beneficial effect, that in addition to the restoration material and/or the process used for hardening the restoration material, the restoration type may be taken into account as well. The restoration type, like geometric aspects of the dental restoration, may be taken into account by an adjustment parameter. For example, a restoration material depending first scaling factor may be provided. Depending on the type of dental restoration to be tested using the testing model, the first scaling factor may be adjusted using a suitable adjustment parameter.

The scaling of the dental restoration due to hardening may not occur uniformly throughout the dental restoration, but slight variations may occur. These variations may, e.g., depend on the geometric form of the dental restoration. The types of dental restoration may be classified according to their geometric features. Thus, a type of dental restoration may identify a type of geometry. The dependency of the variation on the geometric form may be determined by manufacturing different types of dental restorations with different geometries and determining differences in the variations of the scaling due to differences in the geometry.

Alternatively, the scaling factor used, i.e., the first scaling factor, may be an averaged scaling factor.

For example, the method comprises using a trained machine learning module for scaling the size of the 3D digital model of the dental element. The trained machine learning module is configured to provide the 3D digital testing model as output in form of the 3D digital model of the dental element scaled using the first scaling factor in response to receiving the 3D digital model of the dental element and an identifier of a restoration material as input.

Examples may have the beneficial effect, that the trained machine learning module may be used for generating the 3D digital testing model. The 3D digital testing model provided as output by the trained machine learning module is a scaled copy of the 3D digital model of the dental element provided as input. The 3D digital model of the dental element is scaled using the first scaling. The scaling may depend on the restoration material used for generating the dental restoration identified by the identifier of the restoration material provided as input as well.

For example, the method further comprising providing the trained machine learning module. The providing of the trained machine learning module comprises providing a machine learning module to be trained. A set of training datasets for training the machine learning module to be trained is provided. Each training dataset comprises a 3D digital training model of a dental training element, a training identifier of a restoration material and a 3D digital training testing model. The machine learning module to be trained is trained to provide the 3D digital training testing models of the training datasets as output in response to receiving the 3D digital training model of the dental training element and the training identifier of the restoration material of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

Examples may have the beneficial effect, that by training the machine learning module to be trained, the machine learning module may be configured to provide the 3D digital testing model as output in response to receiving the 3D digital model of a dental element and the identifier of the restoration material as input. In order to achieve this goal, a set, i.e., a plurality, of suitable training datasets may be provided. Each of the training datasets may comprise a 3D digital training model of a dental training element and a training identifier of a restoration material defining the input and 3D digital training testing model defining the output to be provided by the machine learning module.

Thus, the resulting trained machine learning module may be configured to provide a 3D digital testing model as output, which is a scaled copy of a 3D digital model of the dental element provided as input. The scaling factor, by which the 3D digital model of the dental element is scaled, may depend on the restoration material identified by the identifier provided in addition as input.

For example, the training datasets each further comprise one or more training process parameters of hardening processes. For each of the training datasets, the one or more training process parameters of the respective training dataset are additionally provided as input for training the machine learning module to be trained. The resulting trained machine learning module is configured for additionally taking into account one or more process parameters of a hardening process to be used for hardening the dental restoration to hardened as input for providing the 3D digital testing model as output.

Examples may have the beneficial effect, that in addition to the restoration material used for manufacturing the dental restoration, the output of the trained machine learning module may in addition depend on one or more process parameters of a hardening process to be used for hardening the dental restoration to hardened, which are provided as additional input.

Thus, the resulting trained machine learning module may be configured to provide a 3D digital testing model as output, which is a scaled copy of a 3D digital model of the dental element provided as input. The scaling factor, by which the 3D digital model of the dental element is scaled, may in addition to the restoration material identified by the identifier provided as input depend on the one or more process parameters of the hardening process provided as additional input.

For example, the training datasets each further comprise a 3D digital training dental restoration model. For each of the training datasets, the 3D digital training dental restoration model of the respective training dataset is additionally provided as input for training the machine learning module to be trained. The resulting trained machine learning module is configured for additionally taking into account a 3D digital dental restoration model as input for providing the 3D digital testing model as output.

Examples may have the beneficial effect, that in addition to the restoration material used for manufacturing the dental restoration, the output of the trained machine learning module may in addition depend on a 3D digital dental restoration model, which is provided as additional input.

Thus, the resulting trained machine learning module may be configured to provide a 3D digital testing model as output, which is a scaled copy of a 3D digital model of the dental element provided as input. The scaling factor, by which the 3D digital model of the dental element is scaled, may in addition to the restoration material identified by the identifier provided as input depend on the 3D digital dental restoration model provided as additional input.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a 3D digital testing model provided as output by the trained machine learning module from other, known values, e.g., a 3D digital model of the dental element and an identifier of a restoration material as input. Furthermore, e.g., one or more process parameters of a hardening process for hardening the dental restoration and/or a 3D digital dental restoration model of the dental restoration to be tested using the testing model may be provided as additional input. According to an example, the machine learning module comprises a deep learning model.

For example, the fitting criteria comprise one or more of the following: an arrangeability of the dental restoration to be hardened at a predefined position on the physical testing model, an adjustability of the dental restoration to be hardened on the physical testing model with a predefined orientation relative to the physical testing model, a provision of a gap between the dental restoration to be hardened and physical the testing model, when the dental restoration to be hardened is arranged at the predefined position on the physical testing model with the predefined orientation, with the gap having a thickness within a predefined range of thicknesses.

A fitting criterion for the fitting of the dental restoration to be hardened on the physical testing model may, e.g., comprise an arrangeability of the dental restoration to be hardened at a predefined position on the physical testing model. In case the dental restoration to be hardened is arrangeable at a predefined position relative to the physical testing model on the physical testing model, the fitting may be assessed to be acceptable.

A fitting criterion may, e.g., comprise an adjustability of the dental restoration to be hardened on the physical testing model with a predefined orientation relative to the physical testing model. In case the dental restoration to be hardened is adjustable on the physical testing model with the predefined orientation relative to the physical testing model, the fitting may be assessed to be acceptable.

A fitting criterion may be a provision of a gap between the dental restoration to be hardened and physical the testing model, when the dental restoration to be hardened is arranged at the predefined position on the physical testing model with the predefined orientation. The gap may have a thickness within a predefined range of thicknesses. The gap may, e.g., have a thickness sufficient to arrange a bonding material between the dental restoration and the physical testing model. Thus, hardened dental restoration may as well may provide a gap to the dental element, when being arranged on the dental element. The gap between the dental restoration and the dental element may be used for arranging a boning material, e.g., dental cement, between the dental restoration and the dental element for bonding the dental restoration to the dental element.

For example, the dental element is one of the following: a tooth prepared for receiving the dental restoration, a tooth stump prepared for receiving the dental restoration, an abutment configured for receiving the dental restoration. Thus, the dental element may be a natural dental element, like a natural tooth of the patient prepared for receiving the dental restoration or a natural tooth stump prepared for receiving the dental restoration. For example, the dental element may be an artificial dental element, like an abutment configured for receiving the dental restoration.

The physical testing model may be a scaled copy of a tooth prepared for receiving the dental restoration. The physical testing model may be a scaled copy of a tooth stump prepared for receiving the dental restoration. The physical testing model may be a scaled copy of an abutment configured for receiving the dental restoration.

For example, the dental restoration is one of the following: a crown, a bridge, a veneer, an inlay, an onlay, an overlay.

In case of a crown, the crown may, e.g., be a full crown, a ⅞ crown or a ¾ crown. ⅞ and ¾ crowns hybrids between an onlay and a full crown. Such partial crowns are categorized based on an estimated wall coverage of the walls of the tooth or tooth stump, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored.

A dental bridge is a permanent appliance that replaces one or more missing teeth. A dental bridge comprises a plurality of artificial dental pieces that are fused together. A bridge may, e.g., be supported on a dental element by one or more of the following: full coverage crown, three-quarter crown, post-retained crown, onlay, overlay, inlay. The dental element may, e.g., be a prepared tooth, prepared tooth stump, or an abutment. An abutment may be anchored using an implant.

A veneer is layer of material placed on a tooth, in order to cover one or more surfaces of the tooth. Indirect veneers are manufactured outside of a patient's oral cavity and then arranged on a tooth within the oral cavity. The tooth may be prepared for receiving the veneer. A laminate veneer may, e.g., cover only a single surface of a tooth, e.g., a labial surface.

Inlays, onlays, and overlays are forms of indirect restoration manufactured outside of a patient's oral cavity as a single, solid piece that fits a specific size and shape of a reception prepared within a tooth of the oral cavity. The inlay, onlay, or overlay is arranged within the respective reception and bonded, e.g., cemented, in place on the prepared tooth. In contrary to a crown, inlays, onlays, and overlays are arranged within a reception prepared within a damaged tooth. The inlays, onlays, and overlays may, e.g., be configured as pinlays.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps. Pinlays are characterized by an additional use of pins to increase their retention. Thus, any inlay, onlay, or overlay may be configured as a pinlay by being braced by pins. Such a pin may, e.g., be inserted at an edge of the tooth or parallel to a groove. In general, the base of a pin is selected to lie in a section of the tooth surface that is free of damage.

In another aspect, the invention relates to a computer program product for providing a physical testing model for testing a fitting of a dental restoration to be hardened before the dental restoration being hardened. The dental restoration is required to fit onto a dental element after being hardened.

The computer program product comprises a computer readable storage medium having program instructions embodied therewith. The program instructions are executable by a processor of a computer device to cause the computer device to provide a 3D digital model of the dental element. Size of the 3D digital model of the dental element is scaled using a first scaling factor. The first scaling factor depends on an inverse of a second scaling factor quantifying a predicted scaling of the size of the dental restoration to be hardened due to the hardening. The scaling of the 3D digital model of the dental element results in a 3D digital testing model for the testing of the fitting of the dental restoration to be hardened. The 3D digital testing model is provided as a template for manufacturing the physical testing model.

The program instructions provided by the computer program product may be configured for causing the computer device to execute any of the computer-implemented steps of the aforementioned methods for providing a physical testing model for testing a fitting of a dental restoration.

In another aspect, the invention relates to a computer device for providing a physical testing model for testing a fitting of a dental restoration to be hardened before the dental restoration being hardened. The dental restoration is required to fit onto a dental element after being hardened.

The computer device comprises a processor and a memory storing program instructions executable by the processor. Execution of the program instructions by the processor causes the computer device to provide a 3D digital model of the dental element. Size of the 3D digital model of the dental element is scaled using a first scaling factor. The first scaling factor depends on an inverse of a second scaling factor quantifying a predicted scaling of the size of the dental restoration to be hardened due to the hardening. The scaling of the 3D digital model of the dental element results in a 3D digital testing model for the testing of the fitting of the dental restoration to be hardened. The 3D digital testing model is provided as a template for manufacturing the physical testing model.

The computer device may be configured for executing any of the computer-implemented steps of the aforementioned methods for providing a physical testing model for testing a fitting of a dental restoration.

In another aspect, the invention relates to a manufacturing system comprising the computer device for providing a physical testing model for testing a fitting of a dental restoration to be hardened before the dental restoration being hardened. The manufacturing system further comprises a manufacturing device configured to manufacture the physical testing model.

Execution of the program instructions by the processor further causes the computer device to control the manufacturing device to manufacture the physical testing model using the 3D digital testing model as a template, the manufactured physical testing model being a physical copy of the template.

The manufacturing system may be configured for manufacturing any of the aforementioned examples of a physical testing model for testing a fitting of a dental restoration.

For example, the manufacturing device comprises at least one of the following: a machining device, a 3D printing device.

In another aspect, the invention relates to a physical testing model for testing and adjusting a fitting of a dental restoration to be hardened before the dental restoration being hardened. The dental restoration is required to fit onto a dental element after being hardened. Geometric form and proportions of the physical testing model resembling geometric form and proportions of the dental element. Size of the physical testing model is scaled relative to size of the dental element using a first scaling factor. The first scaling factor depends on an inverse of a second scaling factor quantifying a predicted scaling of the size of the dental restoration to be hardened due to the hardening.

The physical testing model may, e.g., be a machined, 3D printed and/or casted physical testing model.

The physical testing model may be any of the aforementioned examples of a physical testing model. The physical testing model may be manufactured using any of the aforementioned examples of a method for providing a physical testing model for testing and adjusting a fitting of a dental restoration to be hardened before the dental restoration being hardened.

The above-described examples and embodiments may be combined freely as long as the combinations are not mutually exclusive.

In the following, embodiments of the invention are described in greater detail in which FIG. 1 shows an exemplary dental element with a dental restoration;

In the following similar features are denoted by the same reference numerals.

Figure 2:
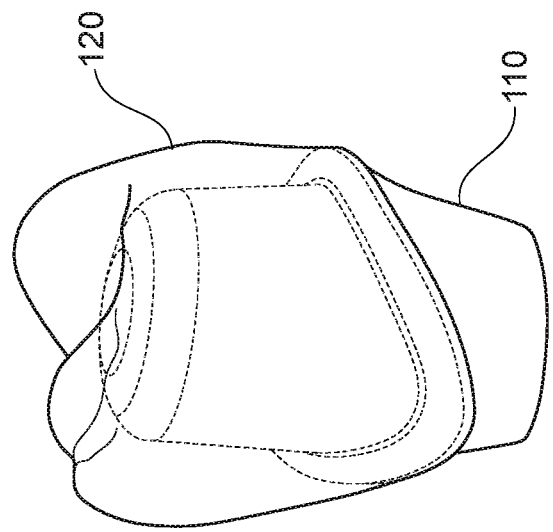
FIG. 2 shows the exemplary dental restoration of FIG. 1 arranged on the dental element.
Figure 1:
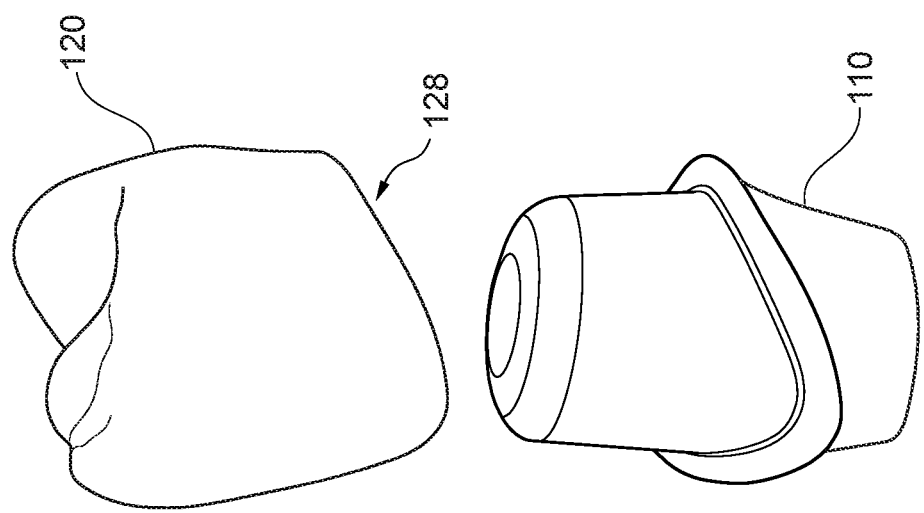

FIG. 1 shows an exemplary dental restoration 120 in form of a crown. The dental restoration 120 is configured to be arranged on a dental element 110 in form of an abutment. The exemplary dental restoration 120 illustrated in FIG. 1 comprises a reception, which is configured to receive the dental element in order to arrange the dental restoration 120 on the dental element 110. FIG. 2 shows the exemplary dental restoration 120 of FIG. 1 arranged on the dental element 110 of FIG. 1. The dental element 110 is received by the dental restoration 120 arranged thereon.

Manufacturing the dental restoration 120 illustrated in FIG. 1 may comprise a hardening process, e.g., sintering. This may have the beneficial effect, that the state of the restoration material while forming the shape of the dental restoration 120, e.g., by machining a blank or by 3D printing, may be softer than the final state of the restoration material after the hardening. Thus, the restoration material, while forming the shape of the dental restoration 120, may be easier to process. The hardening may result in a scaling of the size of the dental restoration 120. Therefore, the dental restoration 120 may initially have to be manufactured using a scaled sized relative to the size of the final dental restoration 120 after hardening as shown in FIG. 1. The size may, e.g., be scaled using a first scaling factor depending on an inverse of a second scaling factor quantifying a predicted scaling of the initial size of dental restoration 120 due to the hardening. Thus, by using a scaled size for initially forming the dental restoration 120, the later scaling due to the hardening may be compensated.

In order to test the fitting of the dental restoration 120 on the dental element 110 before hardening of the dental restoration 120, when a processing of the dental restoration 120 may still be rather easy before the restoration material gains it final degree of hardness due to the hardening, an additional physical testing model may be provided. The physical testing model may be used for testing the fitting of the dental restoration 120 before being hardened. This physical testing model may be a scaled copy of the dental element 110 shown in FIG. 1. i.e., a scaled copy of an abutment. The size of the physical testing model relative to the size of the dental element 110 may be scaled using a first scaling depending on an inverse of a second scaling factor quantifying a predicted scaling of the size of the dental restoration 120 due to the hardening. For example, the size of the physical testing model relative to the size of the dental element 110 may be scaled up. For manufacturing the physical testing model, e.g., a material different from the material used for manufacturing the dental element 110 may be used. The purpose of the physical testing model is to test the fitting of the dental restoration 120. Thus, the testing model is neither required to provide a high stability, nor to last long. For example, a rapid prototyping material, e.g., a plastic material, like a thermoplastic, may be used to manufacture the physical testing model using a rapid prototyping method, like machining or 3D printing.

Figure 4:
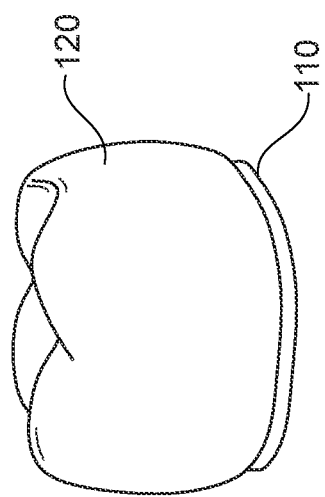
FIG. 4 shows the exemplary dental restoration of FIG. 3 arranged on the dental element.
Figure 3:
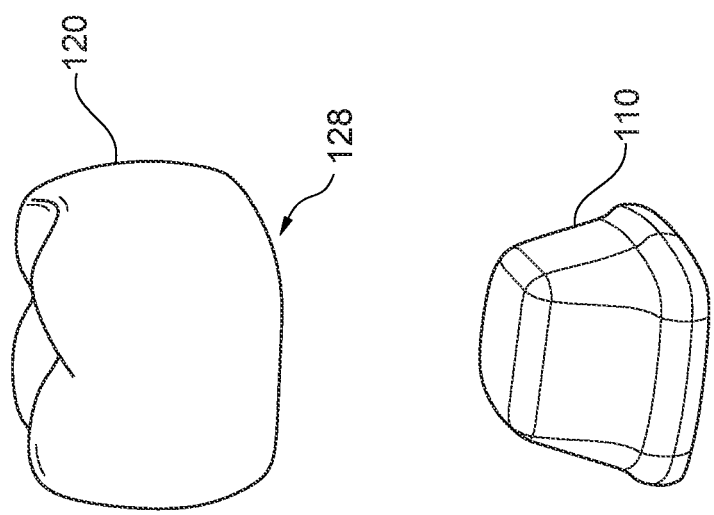
FIG. 3 shows an exemplary dental element with a dental restoration.

FIG. 3 shows a further exemplary dental restoration 120 in form of a crown. The dental restoration 120 is configured to be arranged on a dental element 110 in form of a prepared tooth stump. The exemplary dental restoration 120 illustrated in FIG. 3 comprises a reception, which is configured to receive the dental element in order to arrange the dental restoration 120 on the dental element 110. FIG. 4 shows the exemplary dental restoration 120 of FIG. 1 arranged on the dental element 110 of FIG. 3. The dental element 110 is received by the dental restoration 120 arranged thereon.

For testing the fitting of the dental restoration 120 before hardening, a physical testing model in form of a scaled copy of the dental element 110 shown in FIG. 3, i.e., a scaled copy of a prepared tooth stump of the patient. The size of the physical testing model relative to the size of the dental element 110 may be scaled using a first scaling depending on an inverse of a second scaling factor quantifying a predicted scaling of the size of the dental restoration 120 due to the hardening. For example, the size of the physical testing model relative to the size of the dental element 110 may be scaled up. For manufacturing the physical testing model, e.g., a material different from the material used for manufacturing the dental element 110 may be used. The purpose of the physical testing model is to test the fitting of the dental restoration 120. Thus, the testing model is neither required to provide a high stability, nor to last long. This may in particular be the case, if the testing model is a scaled copy of a patient individual dental element 110, like a patient individually prepared tooth stump, and, e.g., manufactured for testing a fitting of a single dental restoration 120 specifically configured to be arranged on the patient individual dental element 110. For example, a rapid prototyping material, e.g., a plastic material, like a thermoplastic, may be used.

Figure 5:
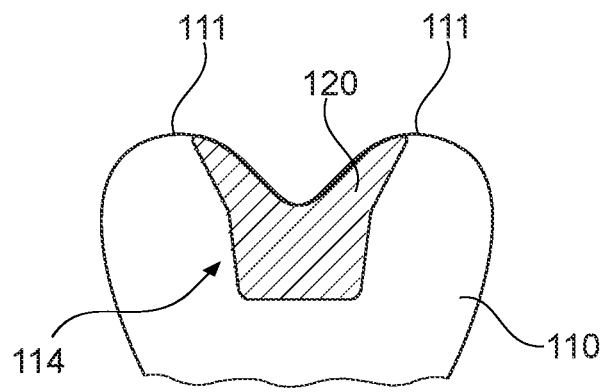
FIG. 5 shows an exemplary dental restoration arranged on a dental element.

FIG. 5 shows a cross-sectional view of an exemplary dental element 110 with an exemplary dental restoration 120 arranged thereon. The exemplary dental restoration 120 of FIG. 5 is an inlay. The exemplary dental element 110 is a tooth prepared to receive the inlay 120. The inlay 120 is configured to be arranged within a reception 114 prepared within the dental element 110. An inner, central section of an occlusal surface of the prepared tooth 110 is covered by the inlay 120, when the inlay 120 is arranged on the dental element 110 within the reception 114. The inlay 120 does not cover any of the cusp 111 or any pointed part of the tooth 110.

For testing the fitting of the dental restoration 120 to be hardened, a physical testing model in form of a scaled copy of the dental element 110 shown in FIG. 5, i.e., a scaled copy of a prepared tooth of the patient. The size of the physical testing model relative to the size of the dental element 110 may be scaled using a first scaling depending on an inverse of a second scaling factor quantifying a predicted scaling of the size of the dental restoration 120 due to the hardening. For example, the size of the physical testing model relative to the size of the dental element 110 may be scaled up. For manufacturing the physical testing model, e.g., a material different from the material used for manufacturing the dental element 110 may be used. The purpose of the physical testing model is to test the fitting of the dental restoration 120. Thus, the testing model is neither required to provide a high stability, nor to last long. This may in particular be the case, if the testing model is a scaled copy of a patient individual dental element 110, like a patient individually prepared tooth, and, e.g., manufactured for testing a fitting of a single dental restoration 120 specifically configured to be arranged on the patient individual dental element 110. For example, a rapid prototyping material, e.g., a plastic material, like a thermoplastic, may be used.

Figure 6:
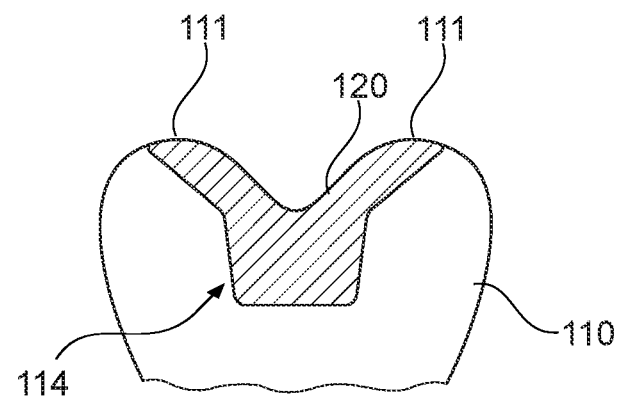
FIG. 6 shows an exemplary dental restoration arranged on a dental element.

FIG. 6 shows a cross-sectional view of a further exemplary dental element 110 with an exemplary dental restoration 120 arranged thereon. The exemplary dental restoration 120 of FIG. 6 is an onlay. The exemplary dental element 110 is a tooth prepared to receive the onlay 120. The onlay 120 is configured to be arranged within a reception 114 prepared within the dental element 110. Like the inlay of FIG. 5, the onlay 120 of FIG. 6 covers an inner, central section of an occlusal surface of the prepared tooth 110, when the onlay 120 is arranged on the dental element 110 within the reception 114. In addition, the onlay 120 covers the cusps 111 of the tooth 110.

For testing the fitting of the dental restoration 120 to be hardened, a physical testing model in form of a scaled copy of the dental element 110 shown in FIG. 6, i.e., a scaled copy of a prepared tooth of the patient. The size of the physical testing model relative to the size of the dental element 110 may be scaled using a first scaling depending on an inverse of a second scaling factor quantifying a predicted scaling of the size of the dental restoration 120 due to the hardening. For example, the size of the physical testing model relative to the size of the dental element 110 may be scaled up. For manufacturing the physical testing model, e.g., a material different from the material used for manufacturing the dental element 110 may be used. The purpose of the physical testing model is to test the fitting of the dental restoration 120. Thus, the testing model is neither required to provide a high stability, nor to last long. This may in particular be the case, if the testing model is a scaled copy of a patient individual dental element 110, like a patient individually prepared tooth, and, e.g., manufactured for testing a fitting of a single dental restoration 120 specifically configured to be arranged on the patient individual dental element 110. For example, a rapid prototyping material, e.g., a plastic material, like a thermoplastic, may be used.

Figure 7:
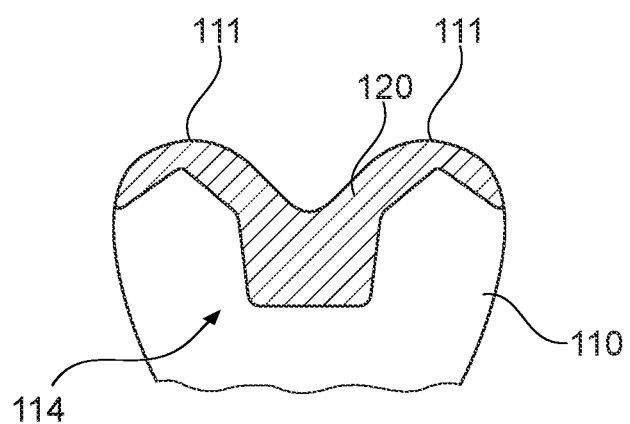
FIG. 7 shows an exemplary dental restoration arranged on a dental element.

FIG. 7 shows a cross-sectional view of a further exemplary dental element 110 with an exemplary dental restoration 120 arranged thereon. The exemplary dental restoration 120 of FIG. 5 is an overlay. The exemplary dental element 110 is a tooth prepared to receive the overlay 120. The overlay 120 is configured to be arranged within a reception 114 prepared within the dental element 110. Like the onlay of FIG. 6, the overlay 120 of FIG. 7 covers an inner, central section of an occlusal surface of the prepared tooth 110 as well as the cusps of the tooth 120, when the overlay 120 is arranged on the dental element 110 within the reception 114. In addition, overlay 120 further extends beyond the cusps 111 of the tooth 120.

For testing the fitting of the dental restoration 120 to be hardened, a physical testing model in form of a scaled copy of the dental element 110 shown in FIG. 7, i.e., a scaled copy of a prepared tooth of the patient. The size of the physical testing model relative to the size of the dental element 110 may be scaled using a first scaling depending on an inverse of a second scaling factor quantifying a predicted scaling of the size of the dental restoration 120 due to the hardening. For example, the size of the physical testing model relative to the size of the dental element 110 may be scaled up. For manufacturing the physical testing model, e.g., a material different from the material used for manufacturing the dental element 110 may be used. The purpose of the physical testing model is to test the fitting of the dental restoration 120. Thus, the testing model is neither required to provide a high stability, nor to last long. This may in particular be the case, if the testing model is a scaled copy of a patient individual dental element 110, like a patient individually prepared tooth, and, e.g., manufactured for testing a fitting of a single dental restoration 120 specifically configured to be arranged on the patient individual dental element 110. For example, a rapid prototyping material, e.g., a plastic material, like a thermoplastic, may be used.

Figure 8:
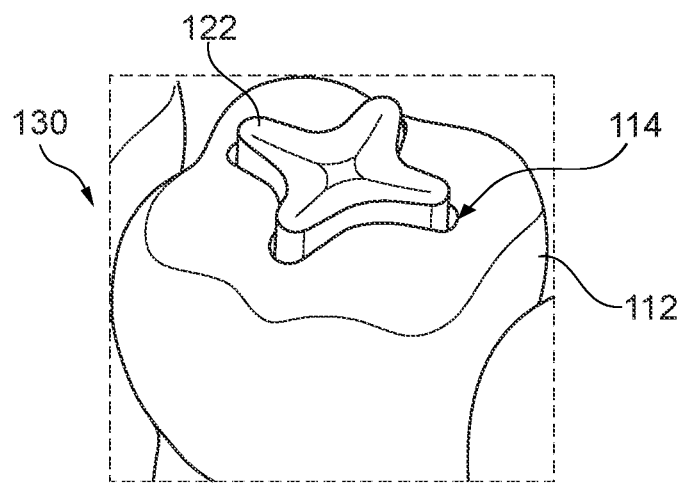
FIG. 8 shows an exemplary 3D digital tissue model with a 3D digital dental restoration model on a 3D digital model of the dental element.

FIG. 8 shows an exemplary 3D digital tissue model 130 comprising a 3D digital model of the dental element 112 in form of a tooth prepared for receiving a 3D digital dental restoration model 122 in form of an inlay. The 3D digital model of the dental element 112 comprises a reception 114 for receiving the 3D digital dental restoration model 122. The 3D digital tissue model 130 may, e.g., be provided using scan of a patient's oral cavity. For example, the patient's tissue in the oral cavity may be scanned intraorally using a scanner, e.g., an optical scanner. The achieved scan data may be used to generate and provide the 3D digital teeth model 130. Alternatively, an impression of the patient's tissue in the oral cavity, i.e., a negative imprint of hard and/or soft tissue may be taken. Either this impression may be scanned, e.g., using an optical scanner or the negative imprint provided by the impression may be used to generate a positive reproduction of the respective tissue of the patient, i.e., a 3D physical tissue model or cast, which is scanned, e.g., by the optical scanner to provide the scan data used to provide the 3D digital tissue model 130. The preparation of the 3D digital model of the dental element 112 may either be a digital preparation of the 3D digital model provided as a template for preparing the natural tooth of the patient resembled by the 3D digital model of the dental element 112 or the preparation may be a preparation of the natural tooth, which is resembled by the 3D digital model of the dental element 112, e.g., using scan data of the preparation. The 3D digital dental restoration model 122 may for example be a 3D digital model generated using the 3D digital model of the dental element 112. For example, the 3D digital dental restoration model 122 may be generated from scratch. For example, an artificial tooth from a tooth library, a scan of an adjacent tooth, or a scan of an antagonist may be used for generating the 3D digital dental restoration model 122.

The 3D digital model of the dental element 112 may be used to generate a 3D digital testing model. The 3D digital testing model may be used as a template for manufacturing a physical testing model. The physical testing model may be used for testing a fitting of a dental restoration to be hardened, before the dental restoration is hardened. For generating the 3D digital testing model, the size of the 3D digital model of the dental element 112 shown in FIG. 8 may be scaled, e.g., scaled up, using a first scaling factor. The first scaling factor may depend on an inverse of a second scaling factor quantifying a predicted scaling of the size of the dental restoration to be hardened due to the hardening. The 3D digital testing model may thus be a scaled copy of the 3D digital model of the dental element 112. A physical testing model manufactured using the 3D digital testing model as a template may thus be a scaled copy of a dental element, e.g., a prepared tooth, as resembled by the 3D digital model of the dental element 112. The purpose of the physical testing model is to test the fitting of the dental restoration. Thus, the testing model is neither required to provide a high stability, nor to last long. This may in particular be the case, if the testing model is a scaled copy of a patient individual dental element, like a patient individually prepared tooth, and, e.g., manufactured for testing a fitting of a single dental restoration specifically configured to be arranged on the patient individual dental element. For example, a rapid prototyping material, e.g., a plastic material, like a thermoplastic, may be used.

Figure 9:
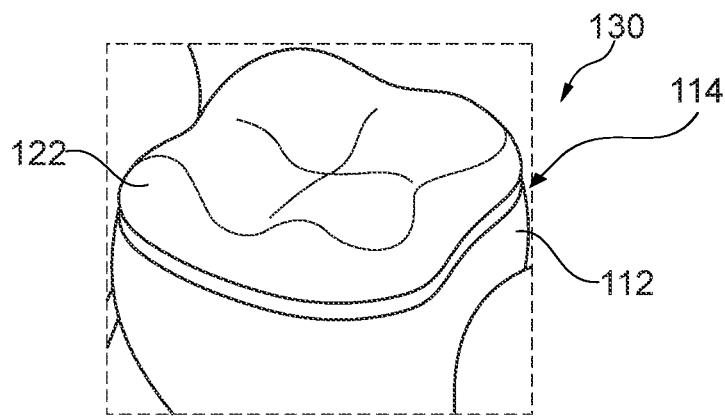
FIG. 9 shows an exemplary 3D digital tissue model with a 3D digital dental restoration model arranged on a 3D digital model of the dental element.

FIG. 9 shows an exemplary 3D digital tissue model 130 comprising a 3D digital model of the dental element 112 in form of a tooth prepared for receiving a 3D digital dental restoration model 122 in form of an overlay. The 3D digital model of the dental element 112 comprises a reception 114 for receiving the 3D digital dental restoration model 122. The 3D digital tissue model 130 may, e.g., be provided using scan of a patient's oral cavity. For example, the patient's tissue in the oral cavity may be scanned intraorally using a scanner, e.g., an optical scanner. The achieved scan data may be used to generate and provide the 3D digital teeth model 130. Alternatively, an impression of the patient's tissue in the oral cavity, i.e., a negative imprint of hard and/or soft tissue may be taken. Either this impression may be scanned, e.g., using an optical scanner or the negative imprint provided by the impression may be used to generate a positive reproduction of the respective tissue of the patient, i.e., a 3D physical tissue model or cast, which is scanned, e.g., by the optical scanner to provide the scan data used to provide the 3D digital tissue model 130. The preparation of the 3D digital model of the dental element 112 may either be a digital preparation of the 3D digital model provided as a template for preparing the natural tooth of the patient resembled by the 3D digital model of the dental element 112 or the preparation may be a preparation of the natural tooth, which is resembled by the 3D digital model of the dental element 112, e.g., using scan data of the preparation. The 3D digital dental restoration model 122 may for example be a 3D digital model generated using the 3D digital model of the dental element 112. For example, the 3D digital dental restoration model 122 may be generated from scratch. For example, an artificial tooth from a tooth library, a scan of an adjacent tooth, or a scan of an antagonist may be used for generating the 3D digital dental restoration model 122.

The 3D digital model of the dental element 112 may be used to generate a 3D digital testing model. The 3D digital testing model may be used as a template for manufacturing a physical testing model. The physical testing model may be used for testing a fitting of a dental restoration to be hardened, before the dental restoration is hardened. For generating the 3D digital testing model, the size of the 3D digital model of the dental element 112 shown in FIG. 9 may be scaled, e.g., scaled up, using a first scaling factor. The first scaling factor may depend on an inverse of a second scaling factor quantifying a predicted scaling of the size of the dental restoration to be hardened due to the hardening. The 3D digital testing model may thus be a scaled copy of the 3D digital model of the dental element 112. A physical testing model manufactured using the 3D digital testing model as a template may thus be a scaled copy of a dental element, e.g., a prepared tooth, as resembled by the 3D digital model of the dental element 112. The purpose of the physical testing model is to test the fitting of the dental restoration. Thus, the testing model is neither required to provide a high stability, nor to last long. This may in particular be the case, if the testing model is a scaled copy of a patient individual dental element, like a patient individually prepared tooth, and, e.g., manufactured for testing a fitting of a single dental restoration specifically configured to be arranged on the patient individual dental element. For example, a rapid prototyping material, e.g., a plastic material, like a thermoplastic, may be used.

Figure 10:
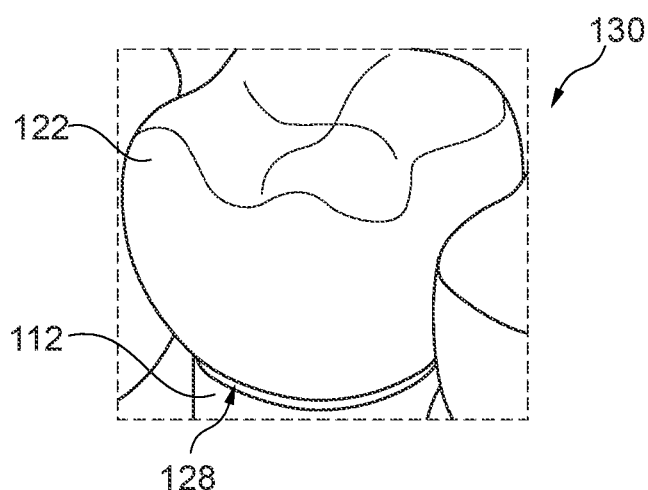
FIG. 10 shows an exemplary 3D digital tissue model with a 3D digital dental restoration model arranged on a 3D digital model of the dental element.

FIG. 10 shows an exemplary 3D digital tissue model 130 comprising a 3D digital model of the dental element 112 in form of a tooth stump prepared for arranging a 3D digital dental restoration model 122 in form of crown thereon. The 3D digital dental restoration model 122 comprises a reception 128 configured for receiving the 3D digital model of the dental element 112 when the 3D digital dental restoration model 122 is arranged on the 3D digital model of the dental element 112. The 3D digital tissue model 130 may, e.g., be provided using scan of a patient's oral cavity. For example, the patient's tissue in the oral cavity may be scanned intraorally using a scanner, e.g., an optical scanner. The achieved scan data may be used to generate and provide the 3D digital teeth model 130. Alternatively, an impression of the patient's tissue in the oral cavity, i.e., a negative imprint of hard and/or soft tissue may be taken. Either this impression may be scanned, e.g., using an optical scanner or the negative imprint provided by the impression may be used to generate a positive reproduction of the respective tissue of the patient, i.e., a 3D physical tissue model or cast, which is scanned, e.g., by the optical scanner to provide the scan data used to provide the 3D digital tissue model 130. The preparation of the 3D digital model of the dental element 112 may either be a digital preparation of the 3D digital model provided as a template for preparing the natural tooth or tooth stump of the patient resembled by the 3D digital model of the dental element 112 or the preparation may be a preparation of the natural tooth stump, which is resembled by the 3D digital model of the dental element 112, e.g., using scan data of the preparation. The 3D digital dental restoration model 122 may for example be a 3D digital model generated using the 3D digital model of the dental element 112. For example, the 3D digital dental restoration model 122 may be generated from scratch. For example, an artificial tooth from a tooth library, a scan of an adjacent tooth, or a scan of an antagonist may be used for generating the 3D digital dental restoration model 122.

The 3D digital model of the dental element 112 may be used to generate a 3D digital testing model. The 3D digital testing model may be used as a template for manufacturing a physical testing model. The physical testing model may be used for testing a fitting of a dental restoration to be hardened, before the dental restoration is hardened. For generating the 3D digital testing model, the size of the 3D digital model of the dental element 112 shown in FIG. may be scaled, e.g., scaled up, using a first scaling factor. The first scaling factor may depend on an inverse of a second scaling factor quantifying a predicted scaling of the size of the dental restoration to be hardened due to the hardening. The 3D digital testing model may thus be a scaled copy of the 3D digital model of the dental element 112. A physical testing model manufactured using the 3D digital testing model as a template may thus be a scaled copy of a dental element, e.g., a prepared tooth stump, as resembled by the 3D digital model of the dental element 112. The purpose of the physical testing model is to test the fitting of the dental restoration. Thus, the testing model is neither required to provide a high stability, nor to last long. This may in particular be the case, if the testing model is a scaled copy of a patient individual dental element, like a patient individually prepared tooth stump, and, e.g., manufactured for testing a fitting of a single dental restoration specifically configured to be arranged on the patient individual dental element. For example, a rapid prototyping material, e.g., a plastic material, like a thermoplastic, may be used.

Figure 11:
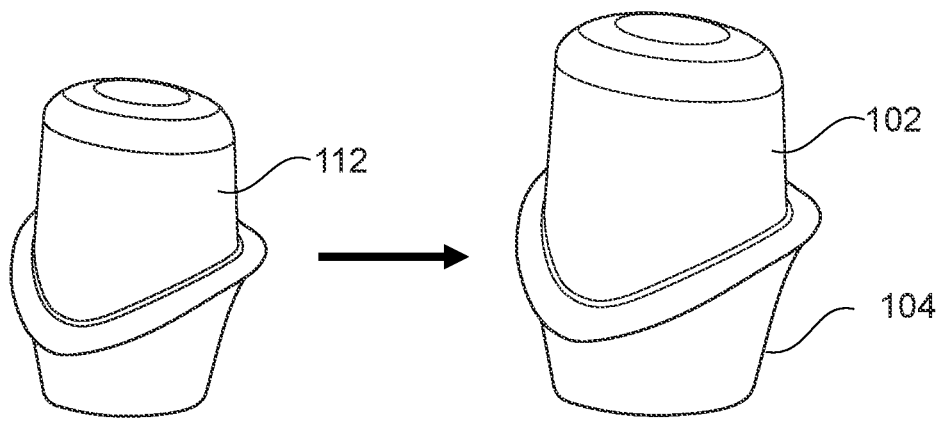
FIG. 11 shows an exemplary scaling of a 3D digital model of the dental element.

FIG. 11 shows an exemplary scaling of a 3D digital model of the dental element 112 resulting in a 3D digital testing model 102. The 3D digital model of the dental element 112 is a model of an abutment. In order to generate the 3D digital testing model 102, the size of the 3D digital model of the dental element 112 is scaled using a first scaling factor. The first scaling factor depends on an inverse of a second scaling factor quantifying a predicted scaling of the size of the dental restoration to be hardened due to the hardening. For example, the 3D digital model of the dental element 112 is scaled up in order to take into account a shrinking of the dental restoration to be hardened due to the hardening. Thus, the 3D digital testing model 102 may be a scaled copy of the 3D digital model of the dental element 112. In order to manufacture a physical testing model for testing a fitting of a dental restoration intended to be arranged on a dental element resembled by the 3D digital model of the dental element 112, the 3D digital testing model may be used as a template. The 3D digital model of the dental element 112 shown in FIG. 11 is a 3D digital model of an abutment. The resulting physical testing model may be scaled copy of the dental element resembled by the 3D digital model of the dental element 112, e.g., an abutment. The purpose of the physical testing model is to test the fitting of the dental restoration. Thus, the testing model is neither required to provide a high stability, nor to last long. For example, a rapid prototyping material, e.g., a plastic material, like a thermoplastic, may be used.

The 3D digital testing model 102 may in addition to a section on which the dental restoration is to be arranged comprise a section which can be used for holding the physical testing model, when testing the fitting of the dental restoration to be hardened on the physical testing model. Alternatively, a holding section 104 may be additionally added or replacing an existing section of the 3D digital model of the dental element 112, not intended to provide support for the dental restoration.

Figure 12:
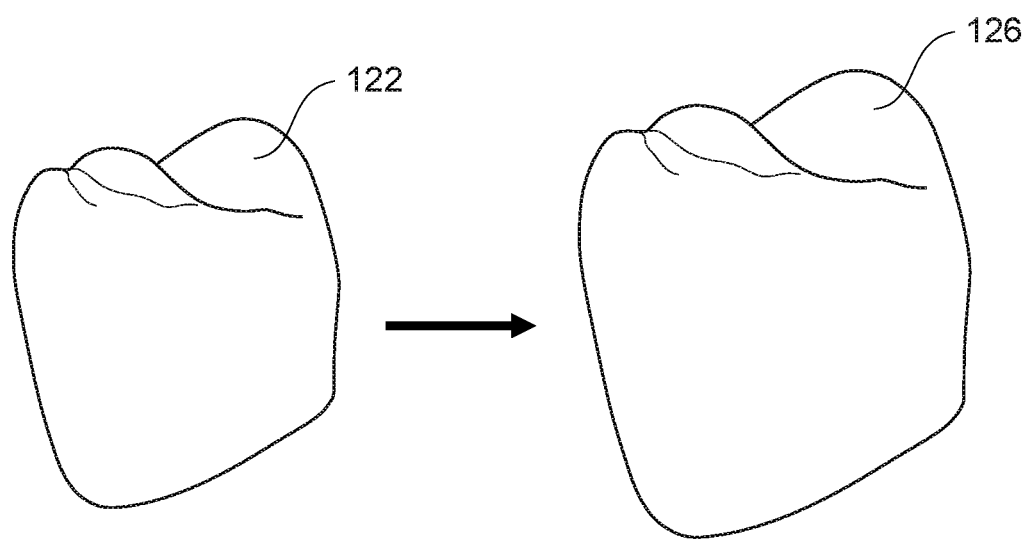
FIG. 12 shows an exemplary scaling of a 3D digital dental restoration model.

FIG. 12 shows an exemplary scaling of a 3D digital dental restoration model 122 resulting in a scaled 3D digital dental restoration model 126, which is used as a template for manufacturing the dental restoration. The 3D digital dental restoration model 122 may, e.g., be generated using a 3D digital tissue model of at least part of a patient's dentition. The 3D digital dental restoration model 122 may be adjusted to fit the patient's anatomical and/or aesthetical features. Furthermore, the 3D digital dental restoration model 122 may be configured to fit onto a dental element, e.g., as resembled by the 3D digital model of the dental element 112 shown in FIG. 11. The 3D digital dental restoration model 122 shown in FIG. 12 is a crown configured to fit on an abutment. The size of the 3D digital dental restoration model 112 may be scaled using a first scaling factor. The first scaling factor may depend on an inverse of a second scaling factor quantifying a predicted scaling of the size of the dental restoration to be hardened due to the hardening. Thus, by scaling the 3D digital dental restoration model 112 the scaling due to the hardening, e.g., a shrinking, may be compensated. A dental restoration manufactured using the scaled 3D digital dental restoration model 126 as a template, such that the manufactured dental restoration is a physical copy of the respective template, may be hardened in order to increase the degree of hardness of the restoration material used for manufacturing the dental restoration. Due to the hardening, the dental restoration may be scaled, e.g., shrink, such that the hardened dental restoration is a physical copy of the 3D digital dental restoration model 122.

In order to test before hardening, whether the dental restoration manufactured using the scaled 3D digital dental restoration model 126 as a template will fit onto the dental element after the hardening, a testing model may be used. The testing model may be a scaled physical copy of the dental element, e.g., an abutment, on which the dental restoration is intended to fit after the hardening.

Figure 13:
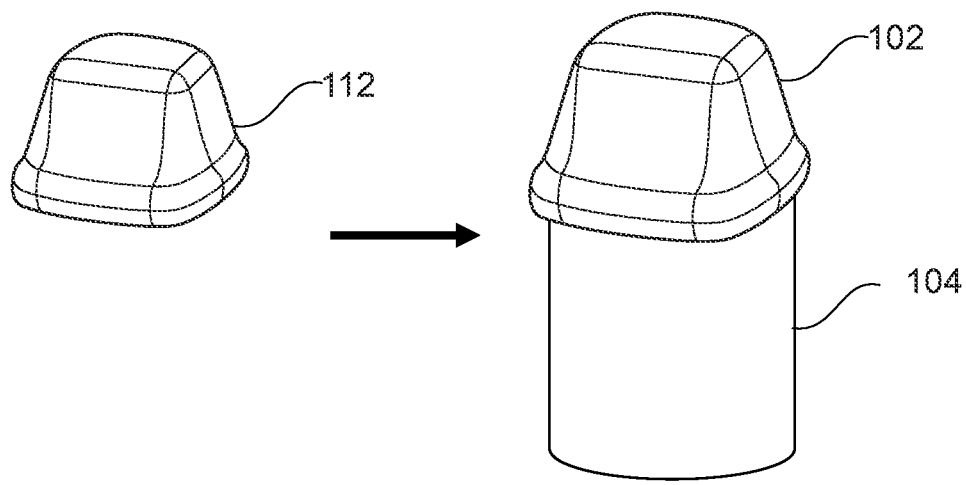
FIG. 13 shows an exemplary scaling of a 3D digital model of the dental element.

FIG. 13 shows a further exemplary scaling of a 3D digital model of the dental element 112 resulting in a 3D digital testing model 102. The 3D digital model of the dental element 112 is a model of a tooth stump prepared for a dental restoration, e.g., a crown, being arranged thereon. In order to generate the 3D digital testing model 102, the size of the 3D digital model of the dental element 112 is scaled using a first scaling factor. The first scaling factor depends on an inverse of a second scaling factor quantifying a predicted scaling of the size of the dental restoration to be hardened due to the hardening. For example, the 3D digital model of the dental element 112 is scaled up in order to take into account a shrinking of the dental restoration to be hardened due to the hardening. Thus, the 3D digital testing model 102 may be a scaled copy of the 3D digital model of the dental element 112. In order to manufacture a physical testing model for testing a fitting of a dental restoration intended to be arranged on a dental element resembled by the 3D digital model of the dental element 112, the 3D digital testing model may be used as a template. The 3D digital model of the dental element 112 shown in FIG. 13 is a 3D digital model of natural tooth stump of a patient prepared for receiving the dental restoration. The resulting physical testing model may be scaled copy of the dental element resembled by the 3D digital model of the dental element 112, e.g., the individual prepared tooth stump. The purpose of the physical testing model is to test the fitting of the dental restoration. Thus, the testing model is neither required to provide a high stability, nor to last long. This may in particular be the case, if the testing model is a scaled copy of a patient individual dental element, like a patient individually prepared tooth stump, and, e.g., manufactured for testing a fitting of a single dental restoration specifically configured to be arranged on the patient individual dental element.

For example, a rapid prototyping material, e.g., a plastic material, like a thermoplastic, may be used. Generating the 3D digital testing model 102 may in addition comprise adding a holding section for holding the physical testing model, when testing the fitting of the dental restoration to be hardened on the physical testing model.

Figure 14:
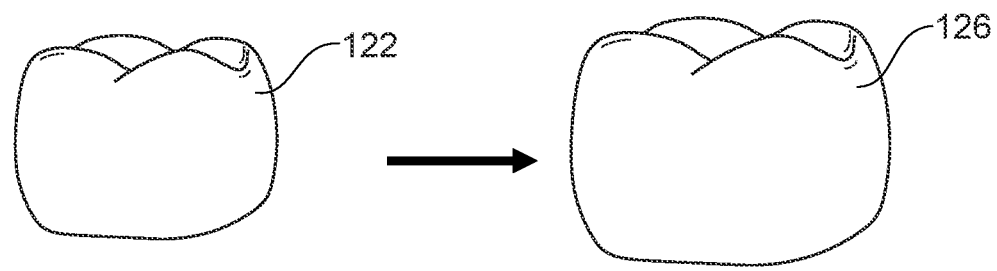
FIG. 14 shows an exemplary scaling of a 3D digital dental restoration model.

FIG. 14 shows an exemplary scaling of a 3D digital dental restoration model 122 resulting in a scaled 3D digital dental restoration model 126, which is used as a template for manufacturing the dental restoration. The 3D digital dental restoration model 122 may, e.g., be generated using a 3D digital tissue model of at least part of a patient's dentition. The 3D digital dental restoration model 122 may be adjusted to fit the patient's anatomical and/or aesthetical features. Furthermore, the 3D digital dental restoration model 122 may be configured to fit onto a dental element, e.g., as resembled by the 3D digital model of the dental element 112 shown in FIG. 13. The 3D digital dental restoration model 122 shown in FIG. 14 is a crown configured to fit on a prepared tooth stump of a patient. The size of the 3D digital dental restoration model 112 may be scaled using a first scaling factor. The first scaling factor may depend on an inverse of a second scaling factor quantifying a predicted scaling of the size of the dental restoration to be hardened due to the hardening. Thus, by scaling the 3D digital dental restoration model 112 the scaling due to the hardening, e.g., a shrinking, may be compensated. A dental restoration manufactured using the scaled 3D digital dental restoration model 126 as a template, such that the manufactured dental restoration is a physical copy of the respective template, may be hardened in order to increase the degree of hardness of the restoration material used for manufacturing the dental restoration. Due to the hardening, the dental restoration may be scaled, e.g., shrink, such that the hardened dental restoration is a physical copy of the 3D digital dental restoration model 122.

In order to test before hardening, whether the dental restoration manufactured using the scaled 3D digital dental restoration model 126 as a template will fit onto the dental element after the hardening, a testing model may be used. The testing model may be a scaled physical copy of the dental element, e.g., a prepared tooth stump of a patient, on which the dental restoration is intended to fit after the hardening.

Figure 15:
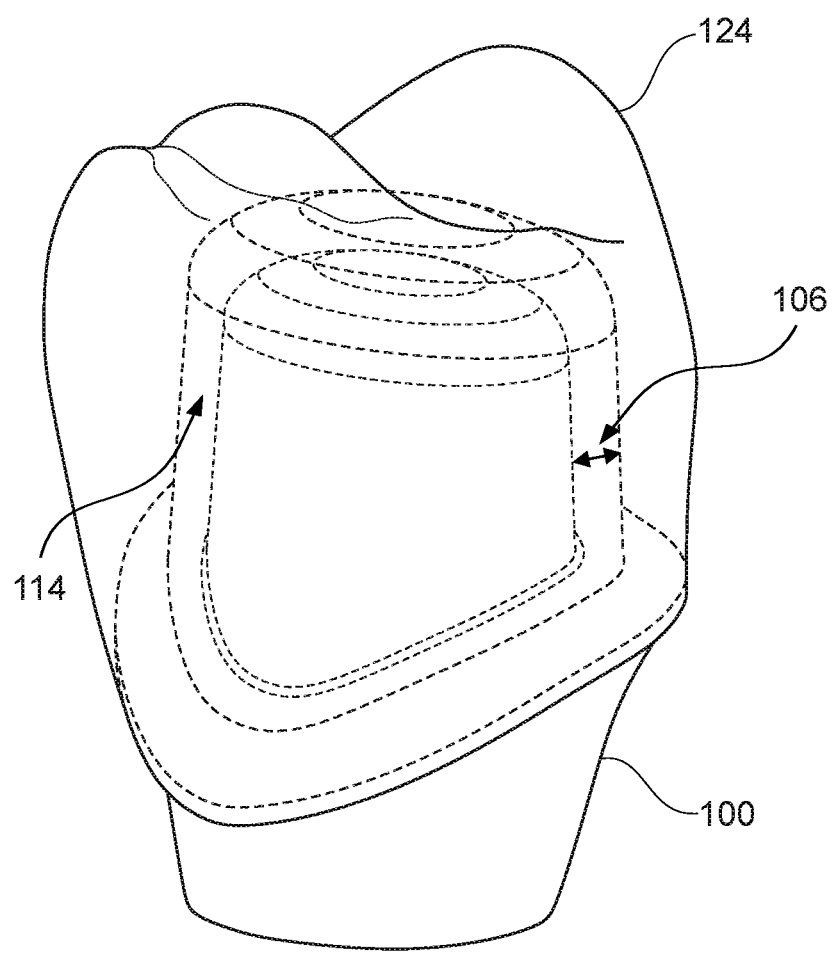
FIG. 15 shows an exemplary dental restoration arranged on a dental element.

FIG. 15 shows an exemplary dental restoration 124 to be hardened arranged on an exemplary testing model 100. The testing model 100 has, e.g., been manufactured using the 3D digital testing model 102 of FIG. 11 as a template. The scaling factor used for scaling the 3D digital model of the dental element 112 of FIG. 11 may have been adjusted such that the gap 106 results between the testing model 100 manufactured using the 3D digital testing model 102 as a template and the dental restoration 124 manufactured using the scaled 3D digital dental restoration model 126 of FIG. 12 as a template. For example, the scaling factor used for scaling the 3D digital model of the dental element 112 may have been slightly smaller than the scaling factor used for scaling the scaled 3D digital dental restoration model 126. The gap is established, when the dental restoration 124 to be hardened is arranged on the physical testing model 100, i.e., when the physical testing model 100 is receipt by the reception 114 of the dental restoration 124. A thickness of the gap is configured for receiving a pressure sensitive material between the physical testing model 100 and the dental restoration 124 to be hardened. The pressure sensitive material is configured to indicate pressure points. These pressure points may indicate sections of the dental restoration 124 to be hardened requiring adjusting to improve the fitting of the dental restoration 124 to be hardened onto the physical testing model 100. Such sections indicated by pressure points may be section of the physical testing model 100 at which the thickness of the gap is insufficient, i.e., where the size reception of the physical testing model 100 is insufficient. The adjusting of these section may comprise removing restoration material from the physical testing model 100. Thus, the fitting of the dental restoration 124 to be hardened onto the physical testing model 100 may be tested and, if necessary, adjusted before hardening of the dental restoration 124 to be hardened.

Figure 16:
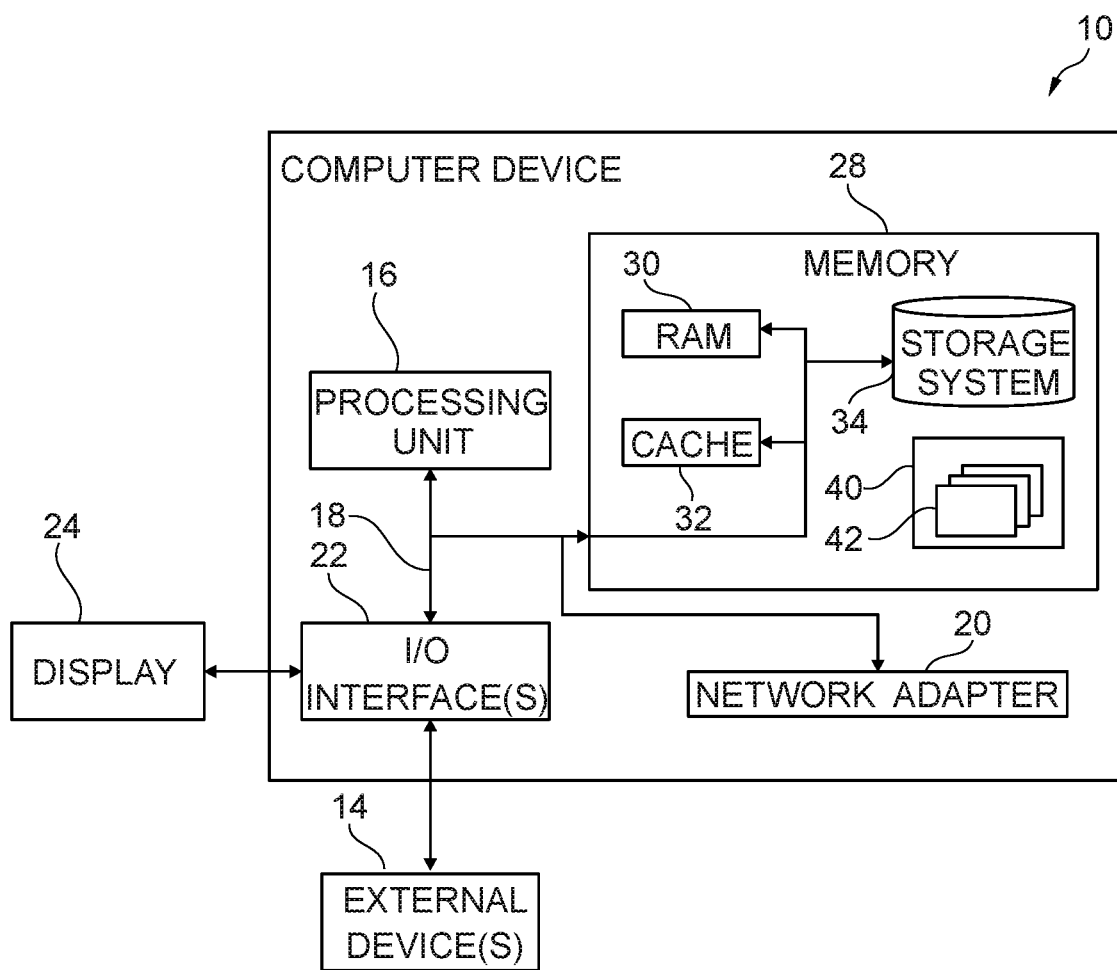
FIG. 16 shows an exemplary computer device for providing a template for a physical testing model.

FIG. 16 shows a schematic diagram of an exemplary computer device 10 for providing 3D digital testing model as a template for manufacturing the physical testing model. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 16, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a 3D digital tissue model of a patient received by the computer device 10. The 3D digital tissue model may comprise a 3D digital model of a dental element, e.g., a natural tooth or tooth stump prepared for receiving a dental restoration. Memory 28 may, e.g., include scan data of a patient's mouth from an intraoral scan or from a scan of a classical mold/impression, e.g., providing information about the surface structure of the patient's intraoral tissue comprising a dental element, e.g., a natural tooth or tooth stump prepared for receiving a dental restoration. The scan data may comprise scan data of the dental element. Memory 28 may, e.g., include the 3D digital model of a dental element, which is independent of a 3D digital tissue model of a patient, e.g., an artificial abutment. Memory 28 may, e.g., include scan data of a dental element in form of an artificial dental element, e.g., an artificial abutment.

Memory 28 may, e.g., include 3D digital dental restoration model of a dental restoration to be arranged on the dental element. Memory 28 may, e.g., include a library of restoration materials with each of the restoration materials being assigned with at least one scaling factor. Memory 28 may, e.g., include a library of restoration types with each of the restoration types being assigned with one or more adjustment parameters for a restoration type specific adjusting a scaling factor. Memory 28 may, e.g., comprise a trained machine learning module trained for scaling the size of 3D digital models of the dental elements. The trained machine learning module may be configured to provide a 3D digital testing model as output in form of a 3D digital model of the dental element scaled using a scaling factor in response to receiving a 3D digital model of the dental element and an identifier of a restoration material. The trained machine learning module may further be trained to take into account one or more process parameters of a hardening process to be used for hardening the dental restoration as input for providing the 3D digital testing model as output. The trained machine learning module may further be trained to take into account a 3D digital training dental restoration model an identifier of a restoration material as input for providing the 3D digital testing model as output.

The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to be trained for scaling the size of 3D digital models of the dental elements. The machine learning module to be trained may, e.g., be an untrained machine learning module, a pre-trained machine learning module or a partially trained machine learning module.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may be configured for scaling the size of a 3D digital model of the dental element in order to generate a 3D digital testing model. One of the program modules 42 may, e.g., further be configured for scaling the size of a 3D digital dental restoration model. One of the program modules 42 may, e.g., further be configured for generating the 3D digital dental restoration model. One of the program modules 42 may, e.g., be configured to use a trained machine learning module for scaling the size of the 3D digital model of the dental element. One of the program modules 42 may, e.g., be configured to train a machine learning module to be trained to the size of the 3D digital model of the dental element. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 16 may be configured for generating a 3D digital testing model as a template for manufacturing the physical testing model in order to provide a physical testing model for testing a fitting of a dental restoration to be hardened before the dental restoration being hardened. The computer device 10 may be a standalone computer with no network connectivity that may receive data to be processed through a local interface. The data received by computer device 10 may for example comprise scan data of a patient's mouth from an intraoral scan or from a scan of a classical mold/impression, e.g., providing information about the surface structure of the patient's intraoral tissue comprising the one or more teeth to be restored. This data may be used to provide a 3D digital tissue model of the patient's oral cavity comprising the one or more teeth to be restored. Alternatively, the data received may, e.g., comprise the 3D digital tissue model. The 3D digital tissue model may, e.g., comprise a 3D digital model of a dental element for which a fitting dental restoration is to be manufactured. The 3D digital model of a dental element may, e.g., be a natural tooth of a stump of a natural tooth prepared for receiving the dental restoration. For example, the computer device 10 may receive the 3D digital model of the dental element, e.g., an artificial abutment. The data received by computer device 10 may for example comprise a 3D digital dental restoration model of the dental restoration to be arranged on the dental element. The data received by computer device 10 may for example comprise a library of restoration materials with each of the restoration materials being assigned with at least one scaling factor. The data received by computer device 10 may for example comprise a library of restoration types with each of the restoration types being assigned with one or more adjustment parameters for a restoration type specific adjusting a scaling factor.

The data received by computer device 10 may for example comprise a machine learning module to be trained. The machine learning module to be trained may, e.g., be an untrained machine learning module, a pre-trained machine learning module or a partially trained machine learning module. The data received by computer device 10 may for example comprise training datasets for training the machine learning module to be trained for scaling the size of 3D digital models of the dental elements. The data received by computer device may for example comprise a trained machine learning module trained for scaling the size of 3D digital models of the dental elements. The trained machine learning module may be configured to provide a 3D digital testing model as output in form of a 3D digital model of the dental element scaled using a scaling factor in response to receiving a 3D digital model of the dental element and an identifier of a restoration material. The trained machine learning module may further be trained to take into account one or more process parameters of a hardening process to be used for hardening the dental restoration as input for providing the 3D digital testing model as output. The trained machine learning module may further be trained to take into account a 3D digital training dental restoration model an identifier of a restoration material as input for providing the 3D digital testing model as output.

The computer device 10 may be used to generating a 3D digital testing model as a template for manufacturing the physical testing model. Such operation may, however, likewise be performed using a computer device that is connected to a network such as a communications network and/or a computing network.

Figure 17:
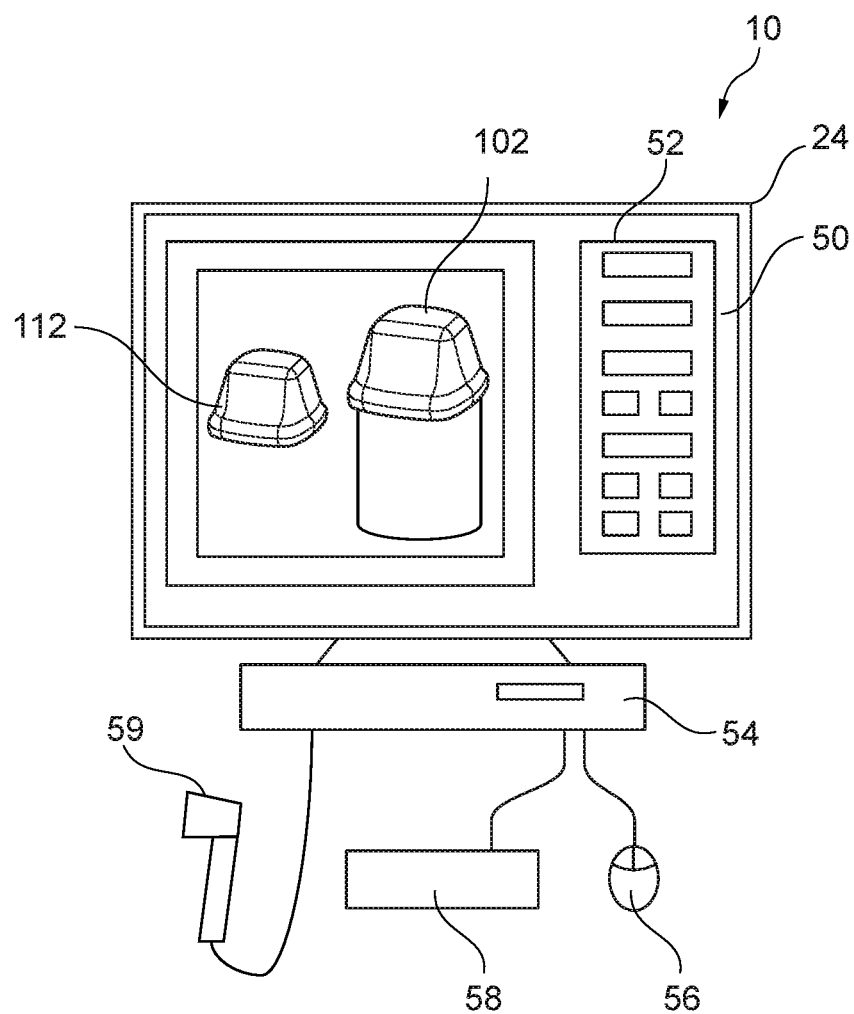
FIG. 17 shows an exemplary computer device for providing a template for a physical testing model.

FIG. 17 shows an exemplary system computer device 10 for generating a 3D digital testing model as a template for manufacturing the physical testing model in order to provide a physical testing model for testing a fitting of a dental restoration to be hardened before the dental restoration being hardened. The computer device 10 may, e.g., be configured as shown in FIG. 16. The computer device 10 may comprise a hardware component 54 comprising one or more processors as well as a memory storing machine-executable program instructions. Execution of the program instructions by the one or more processors may cause the one or more processors to control the computer device 10 to generate the 3D digital testing model as a template for manufacturing the physical testing model in order to provide a physical testing model for testing a fitting of a dental restoration to be hardened before the dental restoration being hardened.

For generating the 3D digital testing model, the size of a 3D digital model of a dental element may be scaled using a first scaling factor. The first scaling factor depends on an inverse of a second scaling factor quantifying a predicted scaling of a size of a dental restoration to be hardened due to the hardening. The scaling of the 3D digital model of the dental element results in a 3D digital testing model for the testing of the fitting of the dental restoration to be hardened. This 3D digital testing model is provided as a template for manufacturing the physical testing model.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the generating and providing the 3D digital testing model 102. The generating of the 3D digital testing model 102 may comprise scaling a 3D digital model of a dental element 112. Furthermore, the control elements 52 may, e.g., be used to generate, adjust and/or modify a 3D digital restoration model. The computer device 10 may further comprise a scanner 59, e.g., an opto-electronic scanner or a RFID reader, configured for scanning a code comprising a scaling factor used for scaling the 3D digital model of a dental element 112. The code may, e.g., be provided as an opto-electronically readable label or by a RFID-tag, respectively. Furthermore, computer device 10 may comprise a scanner for scanning a patient's oral cavity, an imprint of a patient's oral cavity and/or a positive of a patient's oral cavity generated using an imprint.

Figure 18:
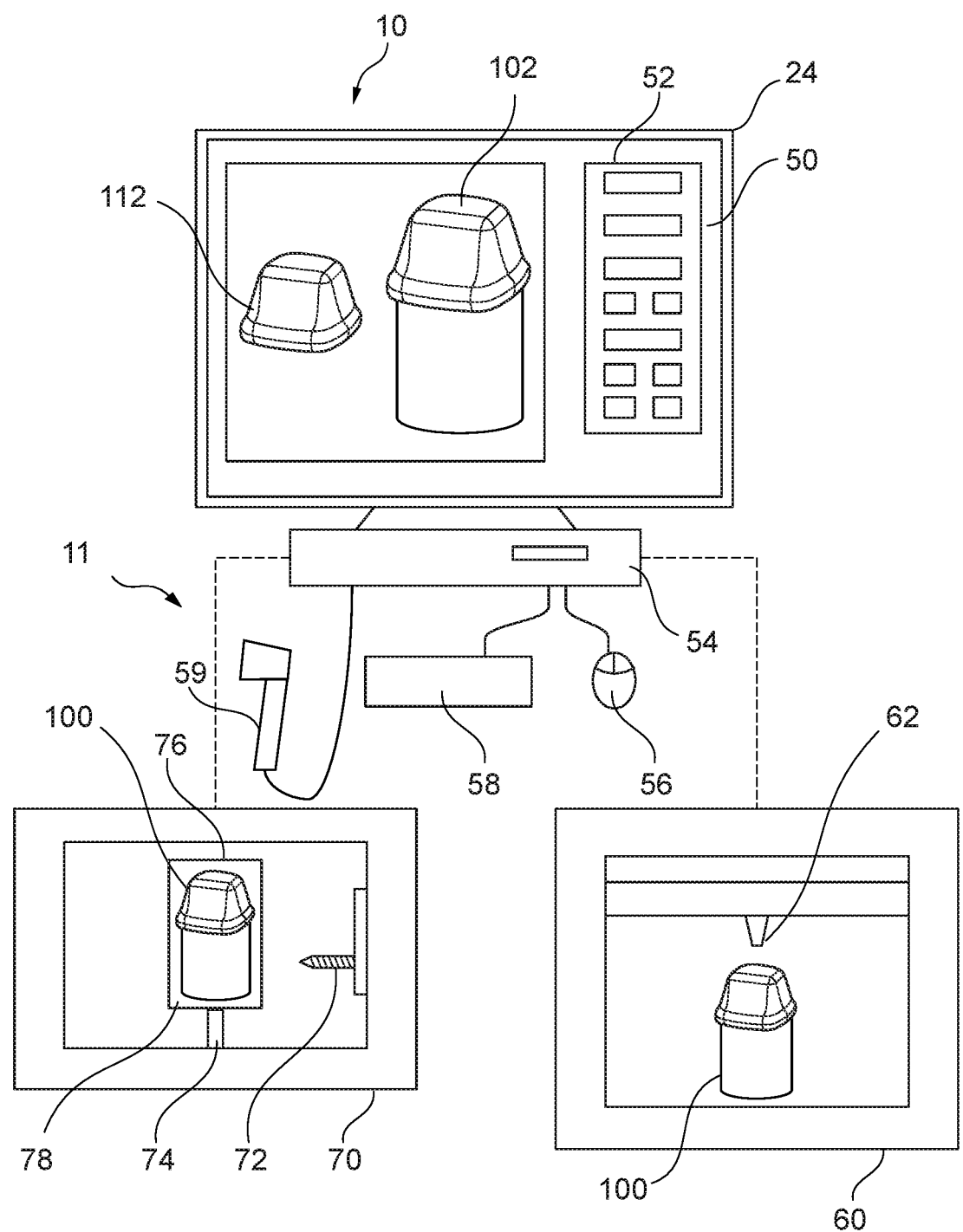
FIG. 18 shows an exemplary system for manufacturing a physical testing model.

FIG. 18 shows an exemplary manufacturing system 11 for manufacturing a physical testing model 100 for testing a fitting of a dental restoration to be hardened before the dental restoration being hardened. For generating a 3D digital testing model 102 as a template for manufacturing the physical testing model 100, a size of a 3D digital model of the dental element 112 is scaled using a factor, which depends on an inverse of a predicted scaling of the size of dental restoration due to the hardening. Furthermore, the manufacturing system 11 may be configured for manufacturing the dental restoration. For this purpose, the manufacturing system 11 may scale a 3D digital dental restoration model and use the resulting scaled 3D digital dental restoration model as a template for manufacturing the dental restoration.

The manufacturing system 11 may comprise the computer device 10 of FIG. 17. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., a physical testing model 100. Furthermore, the machining device 70 may, e.g., be configured for manufacturing the dental restoration using a blank 76 of restoration material, which requires hardening, e.g., sintering, after the machining in order to achieve its final desired hardness. The machining tool 72 may, e.g., be a milling tool. A 3D digital model, e.g., the 3D digital testing model 102, may provide a template for the element being manufactured using the machining device 70, e.g., the physical testing model 100.

For example, the manufacturing system 11 may comprise a manufacturing device in form of a 3D printing device 60. The 3D printing device 60 may be controlled by the computer device and configured to print an element to be manufactured, e.g., a physical testing model 100. The 3D printing device 60 may comprise a printing element 62 configured to print the respective element, like the physical testing model 100, layer by layer. The printing element 62 may, e.g., comprise a nozzle configured for distributing printing material. A 3D digital model, e.g., the 3D digital testing model 102, may provide a template of the physical element manufactured using the 3D printing device 60, e.g., the physical testing model 100.

For example, the 3D printing device 60 may further be used to manufacture the dental restoration using a 3D digital model of the dental restoration as template. For printing the dental restoration, restoration material may be used, which requires hardening, e.g., sintering, after the printing in order to achieve its final desired hardness.

Figure 19:
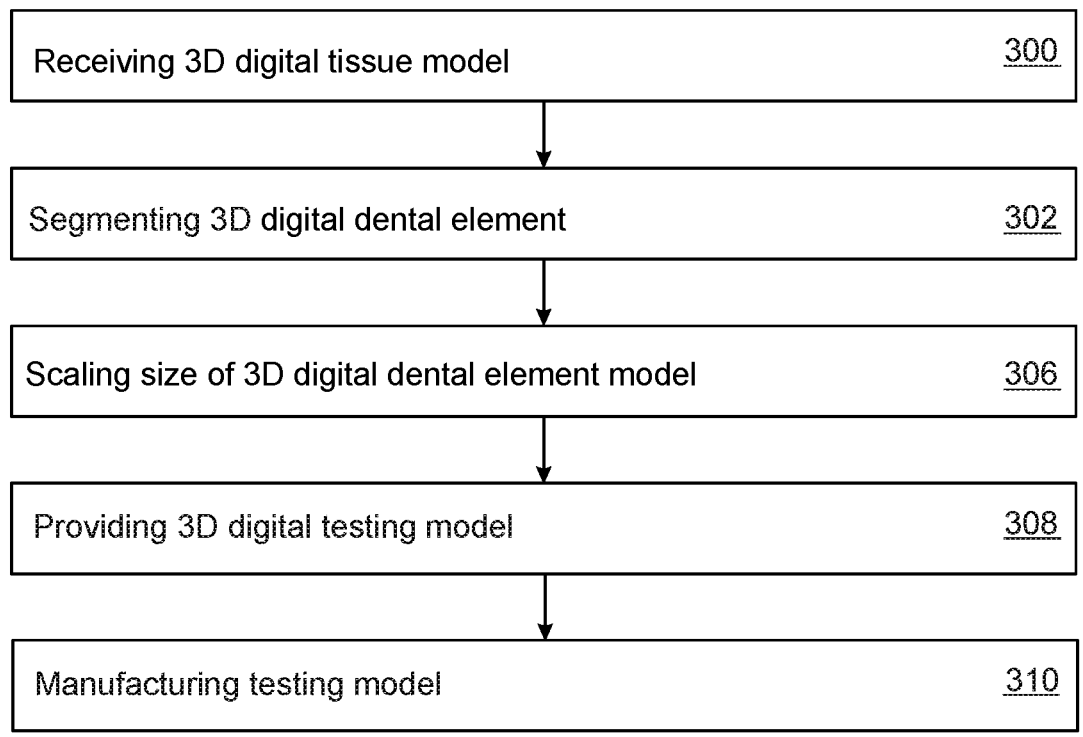
FIG. 19 shows a flowchart illustrating an exemplary method for manufacturing a physical testing model.

FIG. 19 shows an exemplary method for manufacturing a physical testing model for testing a fitting of a dental restoration to be hardened before the dental restoration being hardened. The dental restoration is required to fit onto a dental element after being hardened.

In block 300, a 3D digital tissue model of tissue in a patient's oral cavity is received. The 3D digital tissue model may, e.g., be generated using scan data of the patient's oral cavity. For example, tissue within the patient's oral cavity may be scanned using a scanner, e.g., an optical scanner. The tissue being scanned may comprise the dental element. Thus, the 3D digital tissue model may comprise a 3D digital model of a dental element. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model. The 3D digital tissue model may, e.g., comprise soft tissue, like a gingiva, in addition to hard tissue like teeth and the dental element. The 3D digital tissue model may, e.g., comprise a plurality of teeth of the patient, like a dental arch. The dental arch may, e.g., be a maxillary or a mandibular dental arch.

In block 302, the 3D digital model of a dental element comprised by the 3D digital tissue model may be segmented and extracted from the 3D digital tissue model in order to generate the 3D digital testing model. The dental element may, e.g., be a tooth or tooth stump of the patient prepared for arranging the dental restoration thereon. The 3D digital model of a dental element may, e.g., resemble a tooth or tooth stump of the patient, which is additionally digitally prepared for arranging the dental restoration thereon. The digital preparation may be used as a template for preparing the tooth or tooth stump in the patient's oral cavity. Alternatively, the dental element may, e.g., be an artificial abutment arranged in the patient's oral cavity and configured for arranging the dental restoration thereon.

In block 306, a size of the 3D digital model of the dental element is scaled using a first scaling factor. The first scaling factor depends on an inverse of a second scaling factor quantifying a predicted scaling of the size of dental restoration to be hardened due to the hardening. For example, the 3D digital model of the dental element may be scaled up in order to match the size of a dental restoration to be hardened, which has been scaled up in order to compensate a shrinking of the dental restoration due to the hardening, e.g., sintering. The scaling of the 3D digital model of the dental element results in a 3D digital testing model for the testing of the fitting of the dental restoration to be hardened.

In block 308, the 3D digital testing model resulting from block 306 is provided as a template for manufacturing the physical testing model. In block 310, the 3D digital testing model is used as a template for manufacturing the physical testing model. For example, the physical testing model may be manufactured using a machining device configured to manufacture the physical testing model by processing a blank. The resulting physical testing model may be configured for testing a fitting of a dental restoration before hardening of the respective dental restoration. For example, the physical testing model may be manufactured using a 3D printing device, i.e., a printer, configured to print the physical testing model. The resulting physical testing model may be configured for testing a fitting of a dental restoration before hardening of the respective dental restoration. For example, the 3D digital testing model may be used as a positive to define a negative of the physical testing model in form of a negative 3D digital testing model. The negative 3D digital testing model may be used to manufacture, e.g., using machining or 3D printing, a casting matrix. The casting matrix may be configured for casting the physical testing model by inserting casting material into the casting matrix and curing the inserted casting material. The resulting physical testing model may be configured for testing a fitting of a dental restoration before hardening of the respective dental restoration.

Figure 20:
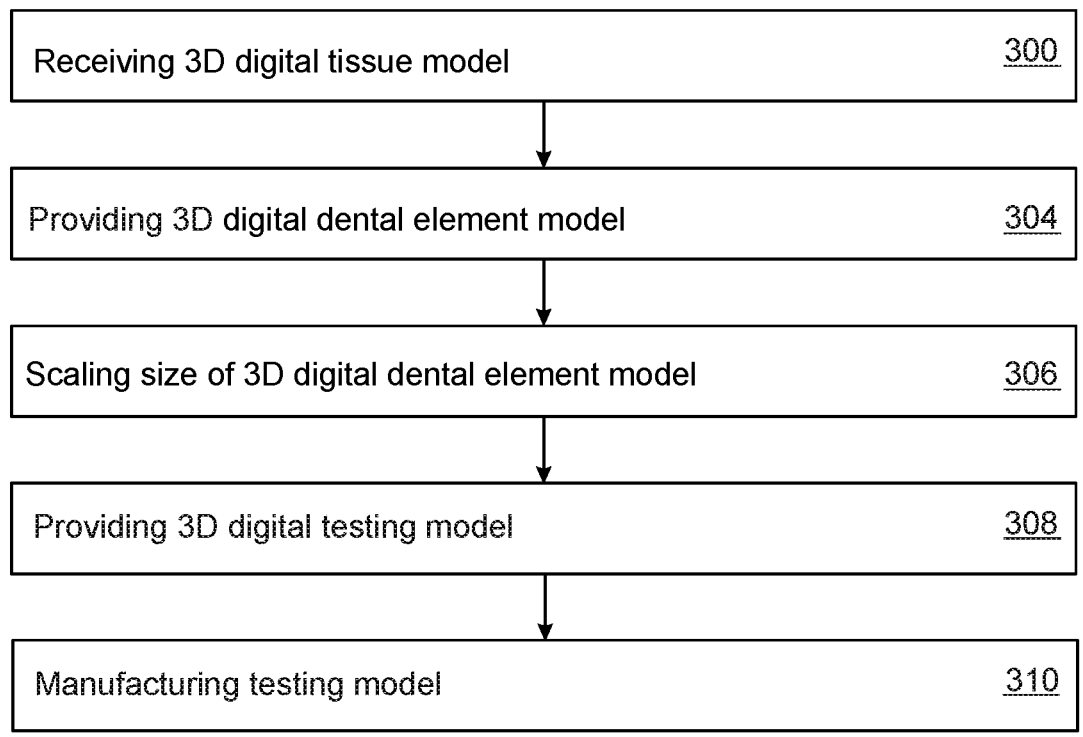
FIG. 20 shows a flowchart illustrating an exemplary method for manufacturing a physical testing model.

FIG. 20 shows another exemplary method for manufacturing a physical testing model for testing a fitting of a dental restoration to be hardened before the dental restoration being hardened. The dental restoration is required to fit onto a dental element after being hardened.

In block 300, a 3D digital tissue model of tissue in a patient's oral cavity is received. The 3D digital tissue model may, e.g., be generated using scan data of the patient's oral cavity. For example, tissue within the patient's oral cavity may be scanned using a scanner, e.g., an optical scanner. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model. The 3D digital tissue model may, e.g., comprise soft tissue, like a gingiva, in addition to hard tissue like teeth. The 3D digital tissue model may, e.g., comprise a plurality of teeth of the patient, like a dental arch. The dental arch may, e.g., be a maxillary or a mandibular dental arch.

In block 304, a 3D digital model of the dental element may be provided. The 3D digital model of the dental element may, e.g., be a generic dental element, like an abutment. The abutment may be selected from a library of abutments. The selected abutment may be an abutment, which fits into the patient's dentition as defined by the 3D digital tissue model. For example, the 3D digital model of the dental element may be generated using the 3D digital tissue model. The dental element may be generated from scratch or the 3D digital model of the dental element may a selected generic dental element, which is adjusted to the individual anatomical and/or aesthetical characteristic of the patient as defined by the 3D digital tissue model.

In block 306, a size of the 3D digital model of the dental element is scaled using a first scaling factor. The first scaling factor depends on an inverse of a second scaling factor quantifying a predicted scaling of the size of dental restoration to be hardened due to the hardening. For example, the 3D digital model of the dental element may be scaled up in order to match the size of a dental restoration to be hardened, which has been scaled up in order to compensate a shrinking of the dental restoration due to the hardening, e.g., sintering. The scaling of the 3D digital model of the dental element results in a 3D digital testing model for the testing of the fitting of the dental restoration to be hardened.

In block 308, the 3D digital testing model resulting from block 306 is provided as a template for manufacturing the physical testing model. In block 310, the 3D digital testing model is used as a template for manufacturing the physical testing model. For example, the physical testing model may be manufactured using a machining device configured to manufacture the physical testing model by processing a blank. The resulting physical testing model may be configured for testing a fitting of a dental restoration before hardening of the respective dental restoration. For example, the physical testing model may be manufactured using a 3D printing device, i.e., a printer, configured to print the physical testing model. The resulting physical testing model may be configured for testing a fitting of a dental restoration before hardening of the respective dental restoration. For example, the 3D digital testing model may be used as a positive to define a negative of the physical testing model in form of a negative 3D digital testing model. The negative 3D digital testing model may be used to manufacture, e.g., using machining or 3D printing, a casting matrix. The casting matrix may be configured for casting the physical testing model by inserting casting material into the casting matrix and curing the inserted casting material. The resulting physical testing model may be configured for testing a fitting of a dental restoration before hardening of the respective dental restoration.

Figure 21:
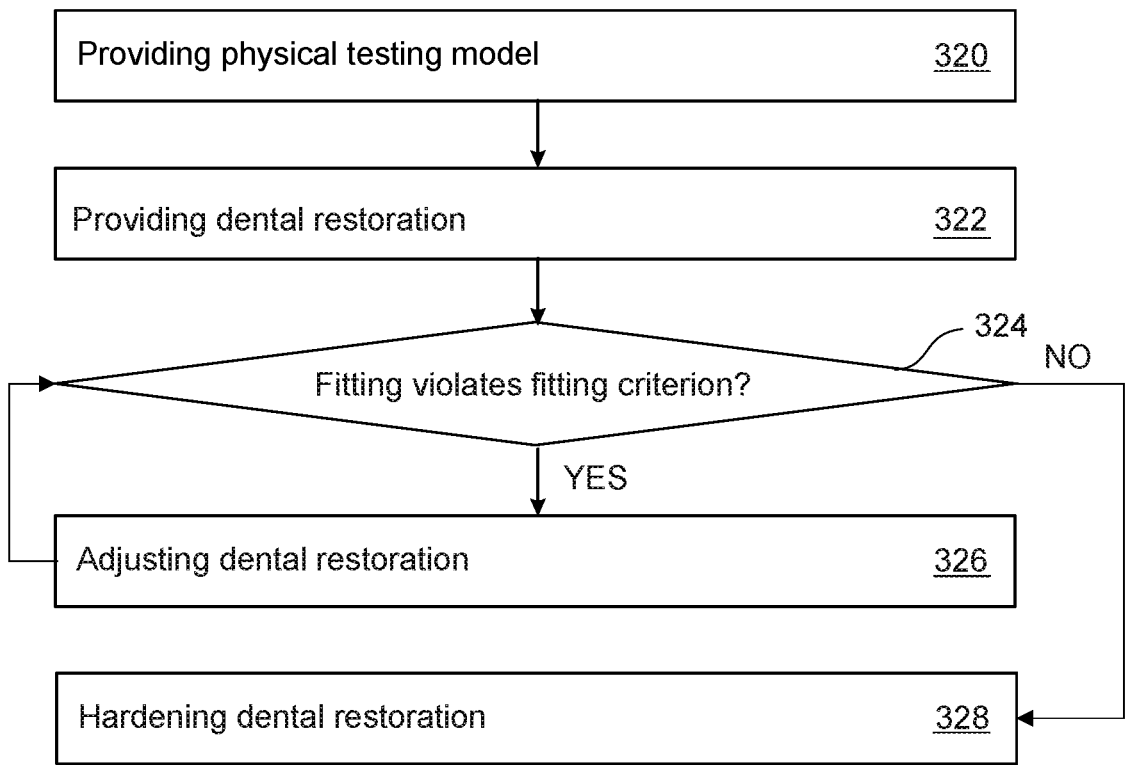
FIG. 21 shows a flowchart illustrating an exemplary method for adjusting a dental restoration.

FIG. 21 shows an exemplary method for adjusting a fitting of a dental restoration to be hardened using a physical testing model, before the dental restoration to be hardened is hardened. In block 320, the physical testing model for testing the fitting of the dental restoration to be hardened. The physical testing model may, e.g., have been manufactured using the method as described in FIG. 19 or FIG. 20. The physical testing model may be a copy of the dental element, which is scaled using a first scaling factor. The first scaling factor may depend on an inverse of a second scaling factor quantifying a predicted scaling of the size of the dental restoration to be hardened due to the hardening. For example, the physical testing model is scaled up relative to the dental element.

In block 322, the dental restoration is provided. The dental restoration may, e.g., be scaled using the first scaling factor. The dental restoration may, e.g., be scaled up in order to compensate a shrinking due to the hardening, e.g., in form of a sintering. The dental restoration may, e.g., have been manufactured using the method as described in FIG. 22. The dental restoration is required to fit onto a dental element after being hardened. The dental restoration may be manufactured using a restoration material, which may still be in a soft state allowing for adjustments of the fitting by adjusting the dental restoration. The state of the restoration material may be considered to be soft relative to a final state of the restoration material after hardening, e.g., sintering, when the restoration material reaches its final indented degree of hardness.

In block 324, the fitting of the dental restoration to be hardened onto the physical testing model is tested. If the fitting violates one or more fitting criteria the method continues with block 326. Else, i.e., if none of the one or more fitting criteria, the method continues with block 328. The one or more fitting criteria tested may, e.g., comprising one or more of the following criteria: an arrangeability of the dental restoration to be hardened at a predefined position on the physical testing model, an adjustability of the dental restoration to be hardened on the physical testing model with a predefined orientation relative to the physical testing model, a provision of a gap between the dental restoration to be hardened and physical the testing model, when the dental restoration to be hardened is arranged at the predefined position on the physical testing model with the predefined orientation, with the gap having a thickness within a predefined range of thicknesses.

In block 328, the dental restoration to be hardened is adjusted, in order to adjust the fitting onto the physical testing model and satisfy the one or more violated fitting criteria. After the adjusting, the one or more violated fitting criteria may be rechecked in block 324. Alternatively (not shown), the method may directly continue with block 328. In block 328, when all the fitting criteria are satisfied by the dental restoration to be hardened, the dental restoration is hardened, e.g., sintered.

Figure 22:
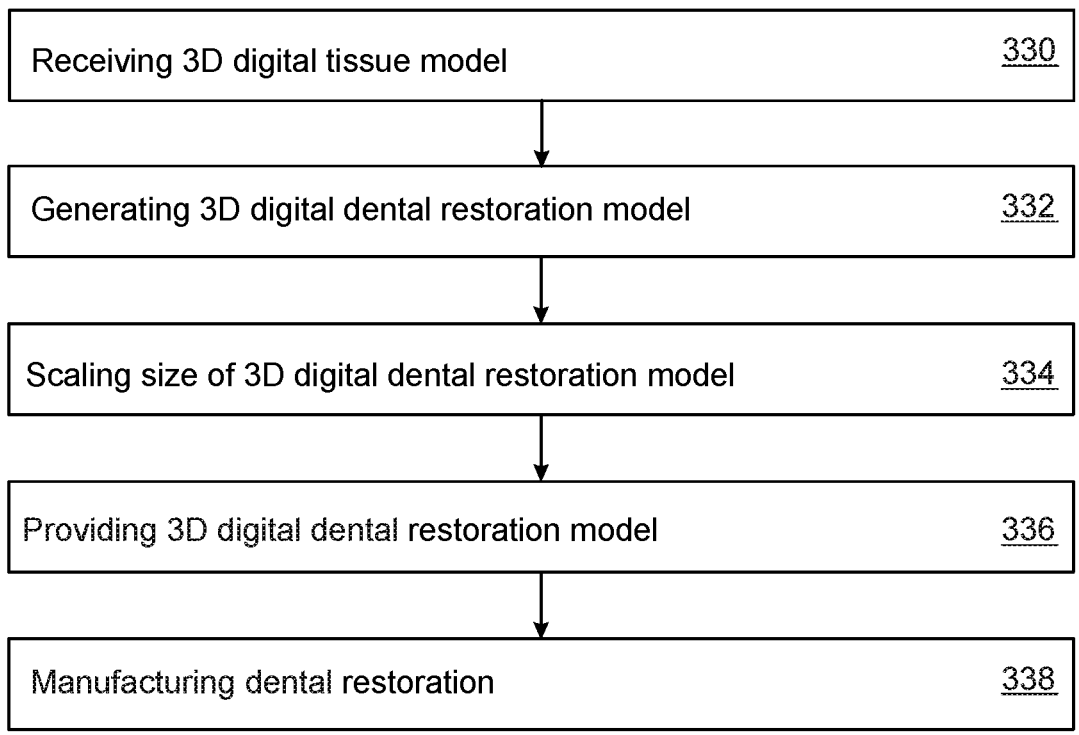
FIG. 22 shows a flowchart illustrating an exemplary method for manufacturing a dental restoration.

FIG. 22 shows an exemplary method for manufacturing a dental restoration to be hardened. In block 330, a 3D digital tissue model of tissue in a patient's oral cavity is received. The 3D digital tissue model may, e.g., be generated using scan data of the patient's oral cavity. For example, tissue within the patient's oral cavity may be scanned using a scanner, e.g., an optical scanner. The tissue being scanned may, e.g., comprise the dental element. Thus, the 3D digital tissue model may comprise a 3D digital model of a dental element. The dental element may, e.g., be a natural tooth or a tooth stump of the patient configured for arranging the dental restoration thereon. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model. The 3D digital tissue model may, e.g., comprise soft tissue, like a gingiva, in addition to hard tissue like teeth and the dental element. The 3D digital tissue model may, e.g., comprise a plurality of teeth of the patient, like a dental arch. The dental arch may, e.g., be a maxillary or a mandibular dental arch. Alternatively, the 3D digital model of the dental element may be generated or selected to fit the anatomical and/or aesthetical requirements of the patient defined by the 3D digital tissue model. The dental element may, e.g., be an artificial abutment configured for arranging the dental restoration thereon.

In block 332, a 3D digital dental restoration model is provided. The 3D digital dental restoration model may, e.g., be generated from scratch. Alternatively, an artificial tooth from a tooth library may be selected. If necessary, the selected artificial tooth may, e.g., be adjusted to fit the anatomical and/or aesthetical characteristics of the patient's dentition as defined by the 3D digital tissue model. Alternatively, a neighboring tooth or an antagonist of a tooth to be restored using the dental restoration may be used to generate the dental restoration. For example, the neighboring tooth or an antagonist may be adjusted to fit the anatomical and/or aesthetical characteristics of the patient's dentition as defined by the 3D digital tissue model.

In block 334, the size of the 3D digital dental restoration model generated in block 332 may scaled using a first scaling factor. The first scaling factor depends on an inverse of a second scaling factor quantifying a predicted scaling of the size of the dental restoration to be hardened due to the hardening. Thus, the scaling of the 3D digital dental restoration model may result in a scaled 3D digital dental restoration model. The scaling, e.g., a scaling up, may be adapted to compensate the predicted scaling of the size of the dental restoration due to the hardening. For example, the hardening, e.g., a sintering, may result in a shrinking of the size of the dental restoration.

In block 336, the scaled 3D digital dental restoration model may be provided as a template for manufacturing the dental restoration. In block 338, the dental restoration is manufactured using the scaled 3D digital dental restoration model as a template for manufacturing the dental restoration. The manufactured dental restoration may be a physical copy of the respective template. Due to the scaling, the manufactured dental restoration has a scaled size taken into account a subsequent scaling of the dental restoration due to the hardening. Thus, bay using a scaled 3D digital dental restoration model as a template a dental restoration to hardened with a size configured for compensating the scaling due to the hardening. As a result, the hardened dental restoration may be a physical copy of the 3D digital dental restoration model, which has the same size. The fitting of the manufactured dental restoration may be tested and adjusted, if necessary, as shown in FIG. 21, before hardening the dental restoration. The dental restoration may, e.g., be hardened using sintering. The dental restoration may be manufactured using a restoration material, which may still be in a soft state allowing for adjustments of the fitting by adjusting the dental restoration. In order to reach its indented degree of hardness, the restoration material may be required to be hardened. The state of the restoration material may be considered to be soft relative to a final state of the restoration material after hardening, e.g., sintering, when the restoration material reaches its final indented degree of hardness.

For example, the dental restoration may be manufactured using a machining device configured to manufacture the dental restoration by processing a blank. The blank may comprise a restoration material required to be hardened, e.g., sintered, in order to reach its final intended degree of hardness. A fitting of the resulting dental restoration to be hardened may be tested using a physical testing model before hardening of the respective dental restoration. For example, the dental restoration may be manufactured using a 3D printing device, i.e., a printer, configured to print the dental restoration. For printing, a restoration material may be used required to be hardened, e.g., sintered, in order to reach its final intended degree of hardness. A fitting of the resulting dental restoration to be hardened may be tested using a physical testing model before hardening of the respective dental restoration. For example, the scaled 3D digital dental restoration model may be used as a positive to define a negative of the dental restoration to be hardened in form of a negative scaled 3D digital dental restoration model. The negative scaled 3D digital dental restoration model may be used to manufacture, e.g., using machining or 3D printing, a casting matrix. The casting matrix may be configured for casting the dental restoration by inserting casting material into the casting matrix and curing the inserted casting material. The casting material may be a restoration material required to be hardened, e.g., sintered, in order to reach its final intended degree of hardness. A fitting of the resulting dental restoration to be hardened may be tested using a physical testing model before hardening of the respective dental restoration.

Figure 23:
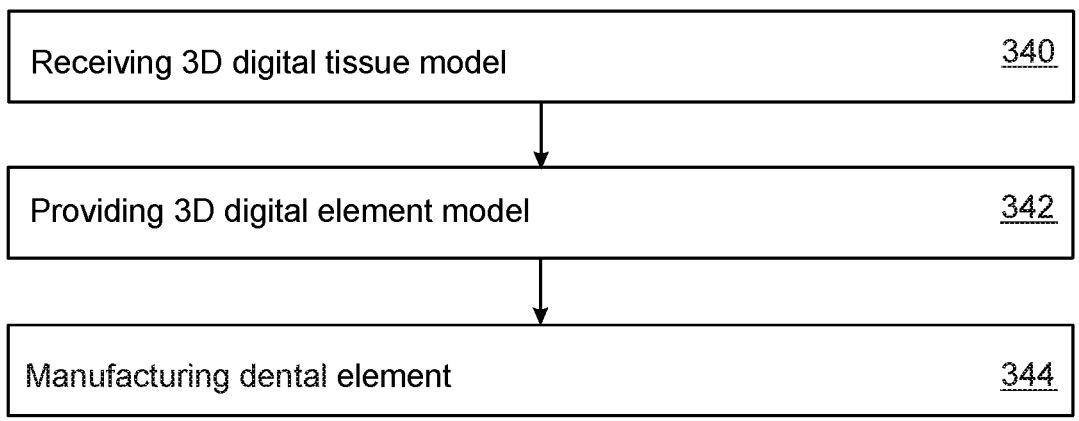
FIG. 23 shows a flowchart illustrating an exemplary method for manufacturing a dental element.

FIG. 23 shows an exemplary method for manufacturing a dental element, e.g., an artificial abutment. In block 340, the method comprises receiving a 3D digital tissue model of tissue in a patient's oral cavity. The 3D digital tissue model may, e.g., be generated using scan data of the patient's oral cavity. For example, tissue within the patient's oral cavity may be scanned using a scanner, e.g., an optical scanner. The achieved scan data may be used to provide the 3D digital tissue model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's tissue, i.e., a 3D physical model or cast of the tissue in the patient's oral cavity, which is scanned, e.g., by the optical scanner to provide the scan data used to generate the 3D digital tissue model. The 3D digital tissue model may, e.g., comprise soft tissue, like a gingiva, in addition to hard tissue like teeth. The 3D digital tissue model may, e.g., comprise a plurality of teeth of the patient, like a dental arch. The dental arch may, e.g., be a maxillary or a mandibular dental arch.

In block 342, a 3D digital model of the dental element may be provided. The 3D digital model of the dental element may, e.g., be selected from a library of dental elements, e.g., abutments. For example, an abutment may be selected, which fits the anatomical and/or aesthetical requirements of the patient defined by the 3D digital tissue model. For example, the selected 3D digital model of the dental element may be adjusted to the anatomical and/or aesthetical requirements of the patient defined by the 3D digital tissue model. Alternatively, the 3D digital model of the dental element may be generated from scratch. The dental element may, e.g., be an artificial abutment configured for arranging the dental restoration thereon.

In block 344, the dental element is manufactured using the 3D digital model of the dental element as a template for manufacturing the dental element. The manufactured dental element may be a physical copy of the respective template. For example, the dental element may be manufactured using a machining device configured to manufacture the dental element by processing a blank. The resulting dental element may be configured for arranging a dental restoration thereon. For example, the dental element may be manufactured using a 3D printing device, i.e., a printer, configured to print the dental element. The resulting dental element may be configured arranging a dental restoration thereon. In case of an artificial abutment, e.g., made using metal, a 3D printing device may, e.g., be used for executing selective laser sintering or melting. Selective laser sintering uses a laser for sintering a powdered material, aiming the laser automatically at points in space defined by a 3D digital model of the element to be printed. The laser energy may result in a local sintering or melting of the powdered material, binding the material together to create a solid structure. For example, a printing element of the 3D printing device may comprise a laser and/or a distributing device for distributing the powdered material.

For example, the 3D digital model of the dental element may be used as a positive to define a negative of the dental element in form of a negative 3D digital model of the dental element. The negative 3D digital model of the dental element may be used to manufacture, e.g., using machining or 3D printing, a casting matrix. The casting matrix may be configured for casting the dental element by inserting casting material into the casting matrix and curing the inserted casting material. The resulting dental element may be configured arranging a dental restoration thereon.

Figure 24:
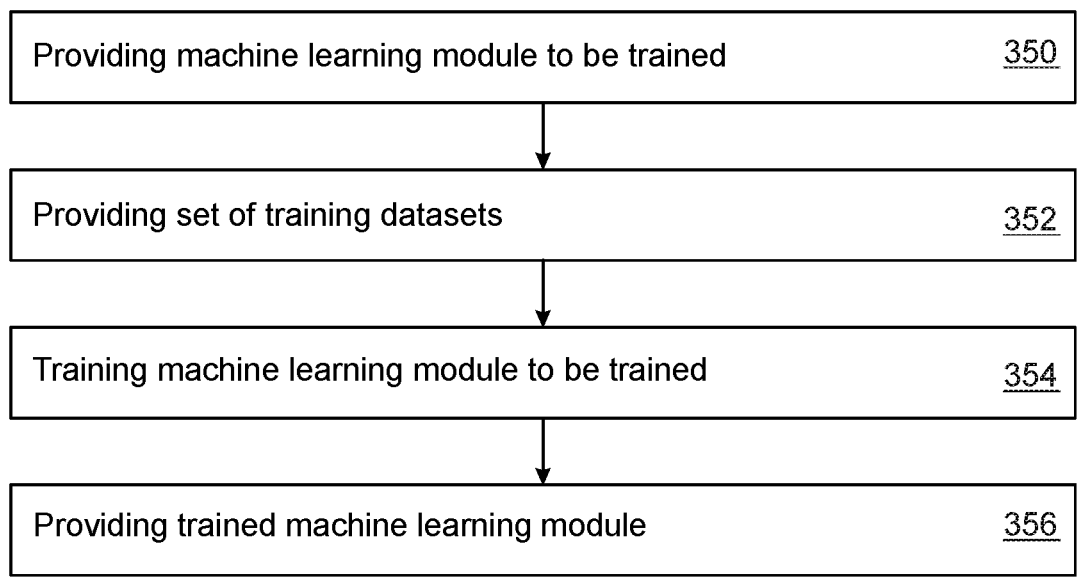
FIG. 24 shows a flowchart illustrating an exemplary method for training a machine learning module to be trained.

FIG. 24 shows an exemplary method for providing a trained machine learning module trained to provide a 3D digital testing model as output in form of a 3D digital model of a dental element scaled using a first scaling factor in response to receiving the 3D digital model of the dental element and an identifier of a restoration material intended to be used for generating a dental restoration as input. The first scaling factor may depend on an inverse of a second scaling factor quantifying a predicted scaling of the size of a dental restoration to be hardened due to the hardening. The 3D digital testing model may be used as a template for manufacturing a physical testing model configured testing a fitting of the dental restoration to be hardened, before the dental restoration is hardened. In block 350, a machine learning module to be trained is provided. The machine learning module to be trained may, e.g., be an untrained machine learning module, a pre-trained machine learning module or a partially trained machine learning module. In block 352, a set of training datasets for training the machine learning module to be trained is provided. Each of the training dataset may comprise a 3D digital training model of a dental training element, a training identifier of a restoration material intended to be used for generating a dental restoration and a 3D digital training testing model.

In block 354, the machine learning module to be trained provided in block 350 is trained using the set of training datasets provided in block 352. The machine learning module to be trained is trained to provide to provide the 3D digital training testing models of the training datasets as output in response to receiving the 3D digital training model of the dental training element and the training identifier of the restoration material of the respective training datasets as input. In block 356, the trained machine learning module resulting from block 354 is provide. The trained machine learning module may be used to provide 3D digital testing models as templates for manufacturing physical testing models. Each of the 3D digital testing models may be provided as output in response to receiving a 3D digital model of a dental element and an identifier of a restoration material intended to be used for generating a dental restoration as input.

For example, the training datasets may each further comprise one or more training process parameters of hardening processes. For each of the training datasets, the one or more training process parameters of the respective training dataset may additionally be provided as input for training the machine learning module to be trained. The resulting trained machine learning module may be configured for additionally taking into account one or more process parameters of a hardening process to be used for hardening the dental restoration to hardened as input for providing the 3D digital testing model as output.

For example, the training datasets may each further comprise a 3D digital training dental restoration model. For each of the training datasets, the 3D digital training dental restoration model of the respective training dataset may additionally be provided as input for training the machine learning module to be trained. The resulting trained machine learning module may be configured for additionally taking into account a 3D digital training dental restoration model as input for providing the 3D digital testing model as output.

Figure 25:
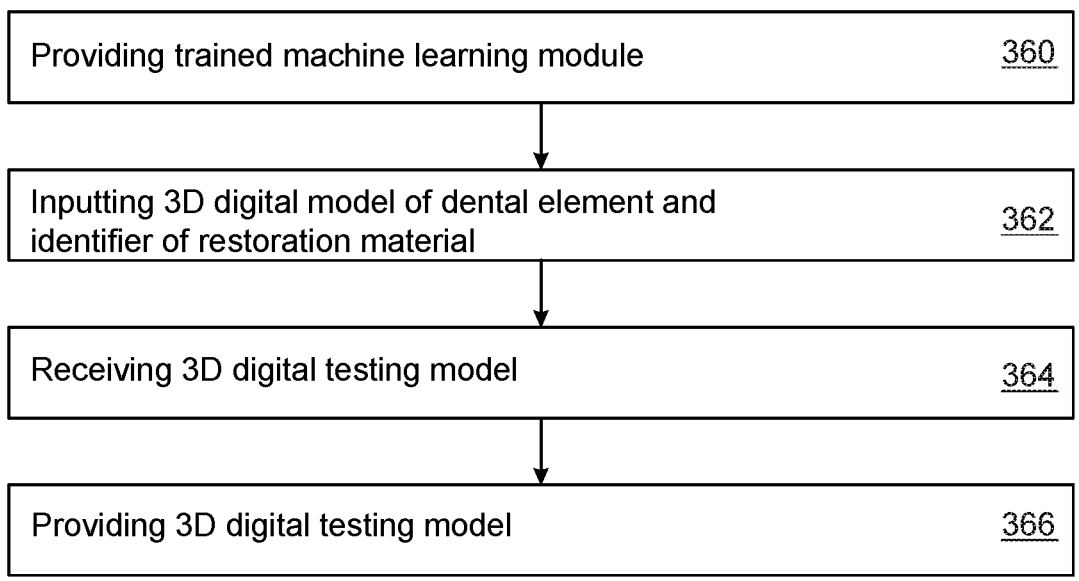
FIG. 25 shows a flowchart illustrating an exemplary method for using a trained machine learning module.

FIG. 25 shows an exemplary method for using a trained machine learning module for generating a 3D digital testing model in form of a 3D digital model of the dental element scaled using a first scaling factor. The first scaling factor may depend on an inverse of a second scaling factor quantifying a predicted scaling of the size of the dental restoration to be hardened due to the hardening. In block 360, the trained machine learning module is provided. The providing may, e.g., comprise a training of a machine learning module to be trained as shown in FIG. 24. The trained machine learning module may be configured to provide the 3D digital testing model as output in response to receiving a 3D digital model of a dental element and an identifier of a restoration material intended to be used for generating a dental restoration as input. In block 362, the 3D digital model of the dental element and the identifier of the restoration material are input into the trained machine learning module. Thus, the trained machine learning module receives the 3D digital model of the dental element and the identifier of the restoration material as input.

In block 364, the 3D digital testing model is received from the trained machine learning module as output in response to the inputting of the 3D digital model of the dental element and the identifier of the restoration material. Thus, the trained machine learning module outputs the 3D digital testing model in response to the receiving of the 3D digital model of the dental element and the identifier of the restoration material. In block 366, the output 3D digital testing model is provided, e.g., as a template for manufacturing the physical testing model. The manufactured physical testing model is a physical copy of the template, i.e., of digital testing model in form of a scaled 3D digital model of the dental element.

For example, the trained machine learning module may further be configured for additionally taking into account one or more process parameters of a hardening process to be used for hardening the dental restoration to hardened as input for providing the 3D digital testing model as output.

For example, the trained machine learning module may further be configured for additionally taking into account a 3D digital training dental restoration model as input for providing the 3D digital testing model as output.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A method for providing a physical testing model for testing a fitting of a dental restoration to be hardened before the dental restoration being hardened, the dental restoration being required to fit onto a dental element after being hardened, the method comprising:
   providing a 3D digital model of the dental element,
   scaling size of the 3D digital model of the dental element using a first scaling factor, the first scaling factor depending on an inverse of a second scaling factor quantifying a predicted scaling of the size of the dental restoration to be hardened due to the hardening, the scaling of the 3D digital model of the dental element resulting in a 3D digital testing model for the testing of the fitting of the dental restoration to be hardened,
   providing the 3D digital testing model as a template for manufacturing the physical testing model.

2. The method of feature combination 1, further comprising manufacturing the physical testing model using the 3D digital testing model as a template, the manufactured physical testing model being a physical copy of the template.

3. The method of feature combination 2, the physical testing model being manufactured using at least one of the following: machining, 3D printing, casting.

4. The method of feature combination 1, further comprising receiving a 3D digital tissue model of tissue in a patient's oral cavity, the 3D digital tissue model comprising the 3D digital model of the dental element.

5. The method of any of feature combinations 1 to 3, further comprising receiving a 3D digital tissue model and generating the 3D digital model of the dental element using the 3D digital tissue model.

6. The method of any of feature combinations 2 to 5, further comprising:
   providing the dental restoration to be hardened,
   testing the fitting of the dental restoration to be hardened onto the physical testing model,
   if the fitting violates one or more fitting criteria, adjusting the dental restoration to be hardened in order to adjust the fitting onto the physical testing model and satisfy the one or more violated fitting criteria,
   hardening the dental restoration to be hardened.

7. The method of feature combination 6, further comprising manufacturing the dental restoration to be hardened, the manufacturing comprising:
   providing a 3D digital dental restoration model,
   scaling size of the 3D digital dental restoration model using the first scaling factor, the scaling of the 3D digital dental restoration model resulting in a template for manufacturing the dental restoration,
   manufacturing the dental restoration using the template for manufacturing the dental restoration, the manufactured dental restoration being a physical copy of the respective template.

8. The method of feature combination 7, the dental restoration being manufactured using at least one of the following: machining, 3D printing, casting.

9. The method of any of feature combinations 7 to 8, further comprising generating the 3D digital dental restoration model using the 3D digital model of the dental element.

10. The method of feature combination 9, further using the 3D digital tissue model for generating the 3D digital dental restoration model.

11. The method of any of the preceding feature combinations, the first scaling factor being an inverse of the second scaling factor.

12. The method of any of the preceding feature combinations, the first scaling factor being adjusted to result in a gap between the dental restoration to be hardened arranged on the physical testing model and the physical testing model, a thickness of the gap being configured for receiving a pressure sensitive material between the dental restoration to be hardened and the physical testing model, the pressure sensitive material being configured to indicate pressure points being used for determining sections of the dental restoration to be hardened requiring adjusting to improve the fitting of the dental restoration to be hardened onto the physical testing model.

13. The method of any of the preceding feature combinations, the second scaling factor being a shrinking factor quantifying a predicted shrinking of the size of the dental restoration to be hardened due to the hardening.

14. The method of any of the preceding feature combinations, the second scaling factor being a restoration-specific scaling factor assigned to the individual dental restoration, the physical testing model being a restoration-specific physical testing model.

15. The method of any of the preceding feature combinations, the hardening of the dental restoration comprising sintering.

16. The method of any of the preceding feature combinations, further comprising receiving the first scaling factor by one of the following: by receiving the first scaling factor as an input, by receiving the first scaling factor as a scan result provided by a scanner configured for scanning a code comprising the first scaling factor.

17. The method of any of feature combinations 1 to 15, further comprising receiving the second scaling factor and calculating the first scaling factor using the second scaling factor, the second scaling factor being received by one of the following: by receiving the second scaling factor as an input, by receiving the second scaling factor as a scan result provided by a scanner configured for scanning a code comprising the second scaling factor.

18. The method of any of feature combinations 1 to 15, further comprising providing a first library of restoration materials, each of the restoration materials being assigned with at least one of the following scaling factors: a restoration material specific first scaling factor, a restoration material specific second scaling factor, the method further comprising:
selecting one of the restoration materials to be used for manufacturing the dental restoration,
using a scaling factor assigned to the selected restoration material for scaling the 3D digital testing model.

19. The method of feature combination 18, the individual restoration materials each being assigned with a plurality of scaling factors, the scaling factors assigned to the individual restoration materials being restoration type specific scaling factors, the method further comprising selecting in addition to one of the restoration materials a restoration type depending on the type of dental restoration for which the physical testing model is to be provided, the scaling factor used for scaling the 3D digital testing model being a scaling factor assigned to the selected restoration material and specific for the selected restoration type.

20. The method of any of feature combinations 18 to 19, the individual restoration materials each being assigned with a plurality of scaling factors, the scaling factors assigned to the individual restoration materials being hardening process specific scaling factors, the method further comprising selecting in addition to one of the restoration materials a hardening process to be used for hardening the dental restoration to hardened, the scaling factor used for scaling the 3D digital testing model being a scaling factor assigned to the selected restoration material and specific for the selected hardening process.

21. The method of any of the preceding feature combinations, further comprising a second library of restoration types, each of the restoration types being assigned with one or more adjustment parameters for a restoration type specific adjusting a first scaling factor, the method further comprising:
selecting one of the restoration types depending on the type of dental restoration for which the physical testing model is to be provided,
using the one or more adjustment parameters assigned to the restoration type for adjusting the first scaling factor used for scaling the 3D digital testing model to the type of dental restoration for which the physical testing model is to be provided.

22. The method of any of the preceding feature combinations, using a trained machine learning module for scaling the size of the 3D digital model of the dental element, the trained machine learning module being configured to provide the 3D digital testing model as output in form of the 3D digital model of the dental element scaled using the first scaling factor in response to receiving the 3D digital model of the dental element and an identifier of a restoration material as input.

23. The method of feature combination 22, further comprising providing the trained machine learning module, the providing of the trained machine learning module comprising:

providing a machine learning module to be trained,
providing a set of training datasets for training the machine learning module to be trained, each training dataset comprising a 3D digital training model of a dental training element, a training identifier of a restoration material and a 3D digital training testing model,
training the machine learning module to be trained to provide the 3D digital training testing models of the training datasets as output in response to receiving the 3D digital training model of the dental training element and the training identifier of the restoration material of the respective training datasets as input.

24. The method of feature combination 23, the training datasets each further comprising one or more training process parameters of hardening processes, for each of the training datasets the one or more training process parameters of the respective training dataset being additionally provided as input for training the machine learning module to be trained, the resulting trained machine learning module being configured for additionally taking into account one or more process parameters of a hardening process to be used for hardening the dental restoration to hardened as input for providing the 3D digital testing model as output.

25. The method of any of feature combinations 23 and 24, the training datasets each further comprising a 3D digital training dental restoration model, for each of the training datasets the 3D digital training dental restoration model of the respective training dataset being additionally provided as input for training the machine learning module to be trained, the resulting trained machine learning module being configured for additionally taking into account a 3D digital training dental restoration model as input for providing the 3D digital testing model as output.

26. The method of any of the preceding feature combinations, the fitting criteria comprising one or more of the following: an arrangeability of the dental restoration to be hardened at a predefined position on the physical testing model, an adjustability of the dental restoration to be hardened on the physical testing model with a predefined orientation relative to the physical testing model, a provision of a gap between the dental restoration to be hardened and physical the testing model, when the dental restoration to be hardened is arranged at the predefined position on the physical testing model with the predefined orientation, with the gap having a thickness within a predefined range of thicknesses.

27. The method of any of the preceding feature combinations, the dental element being one of the following: a tooth prepared for receiving the dental restoration, a tooth stump prepared for receiving the dental restoration, an abutment configured for receiving the dental restoration.

28. The method of any of the preceding feature combinations, the dental restoration being one of the following: a crown, a bridge, a veneer, an inlay, an onlay, an overlay.

29. A computer program product for providing a physical testing model for testing a fitting of a dental restoration to be hardened before the dental restoration being hardened, the dental restoration being required to fit onto a dental element after being hardened, the computer program product comprising a computer readable storage medium having program instructions embodied therewith, the program instructions being executable by a processor of a computer device to cause the computer device to:
provide a 3D digital model of the dental element,
scale size of the 3D digital model of the dental element using a first scaling factor, the first scaling factor depending on an inverse of a second scaling factor quantifying a predicted scaling of the size of the dental restoration to be hardened due to the hardening, the scaling of the 3D digital model of the dental element resulting in a 3D digital testing model for the testing of the fitting of the dental restoration to be hardened, provide the 3D digital testing model as a template for manufacturing the physical testing model.

30. A computer device for providing a physical testing model for testing a fitting of a dental restoration to be hardened before the dental restoration being hardened, the dental restoration being required to fit onto a dental element after being hardened, the computer device comprising a processor and a memory storing program instructions executable by the processor, execution of the program instructions by the processor causing the computer device to:

provide a 3D digital model of the dental element, scale size of the 3D digital model of the dental element using a first scaling factor, the first scaling factor depending on an inverse of a second scaling factor quantifying a predicted scaling of the size of the dental restoration to be hardened due to the hardening, the scaling of the 3D digital model of the dental element resulting in a 3D digital testing model for the testing of the fitting of the dental restoration to be hardened, provide the 3D digital testing model as a template for manufacturing the physical testing model.

31. A manufacturing system comprising the computer device of feature combination 30, the manufacturing system further comprising a manufacturing device configured to manufacture the physical testing model, execution of the program instructions by the processor further causing the computer device to control the manufacturing device to manufacture the physical testing model using the 3D digital testing model as a template, the manufactured physical testing model being a physical copy of the template.

32. The manufacturing system of feature combination 31, the manufacturing device comprising at least one of the following: a machining device, a 3D printing device.

33. A physical testing model for testing and adjusting a fitting of a dental restoration to be hardened before the dental restoration being hardened, the dental restoration being required to fit onto a dental element after being hardened, geometric form and proportions of the physical testing model resembling geometric form and proportions of the dental element, size of the physical testing model being scaled relative to size of the dental element using a first scaling factor, the first scaling factor depending on an inverse of a second scaling factor quantifying a predicted scaling of the size of the dental restoration to be hardened due to the hardening.

LIST OF REFERENCE NUMERALS 10 computer device
11 manufacturing system
14 external device
16 processing unit
18 bus
20 network adapter
22 I/O interface
24 display
28 memory
30 RAM
32 cache 34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 physical testing model
102 3D digital testing model
104 holding extension
106 gap
110 dental element
111 cusp
112 3D digital model of the dental element
114 reception
120 hardened dental restoration
122 3D digital dental restoration model
124 dental restoration to be hardened
126 scaled 3D digital dental restoration model
128 reception
130 3D digital tissue model

The invention claimed is:

1. A method of using a physical testing model for testing a fitting of a manufactured dental restoration to be hardened before the manufactured dental restoration being hardened, the manufactured dental restoration being required to fit onto a dental element after being hardened, the method comprising:

providing a 3D digital model of the dental element;

scaling a size of the 3D digital model of the dental element using a first scaling factor, the first scaling factor depending on an inverse of a second scaling factor quantifying a predicted scaling of the size of the dental restoration to be hardened due to the hardening, the scaling of the 3D digital model of the dental element resulting in a 3D digital testing model for the testing of the fitting of the dental restoration to be hardened;

providing the 3D digital testing model as a template for manufacturing the physical testing model;

manufacturing the physical testing model using the 3D digital testing model as the template, the manufactured physical testing model being a physical copy of the template;

manufacturing the dental restoration to be hardened without using the physical testing model;

providing the manufactured dental restoration to be hardened;

testing the fitting of the manufactured dental restoration to be hardened onto the physical testing model;

when the fitting violates one or more fitting criteria, adjusting the manufactured dental restoration to be hardened in order to adjust the fitting onto the physical testing model and satisfy the one or more fitting criteria that is violated; and hardening the manufactured dental restoration to be hardened.

2. The method of claim 1, wherein the physical testing model is manufactured using at least one of the following: machining, 3D printing, casting.

3. The method of claim 1, further comprising receiving a 3D digital tissue model of tissue from a patient's oral cavity, the 3D digital tissue model comprising the 3D digital model of the dental element.

4. The method of claim 1, further comprising receiving a 3D digital tissue model and generating the 3D digital model of the dental element using the 3D digital tissue model.

5. The method of claim 1, wherein manufacturing the dental restoration to be hardened further comprises:
providing a 3D digital dental restoration model,
scaling the size of the 3D digital dental restoration model using the first scaling factor, the scaling of the 3D digital dental restoration model resulting in the template for manufacturing the dental restoration, and
manufacturing the dental restoration using the template for manufacturing the dental restoration, the manufactured dental restoration comprising the physical copy of the template.

6. The method of claim 5, wherein the dental restoration is manufactured using at least one of the following: machining, 3D printing, casting.

7. The method of claim 5, further comprising generating the 3D digital dental restoration model using the 3D digital model of the dental element.

8. The method of claim 7, further using a 3D digital tissue model for generating the 3D digital dental restoration model.

9. The method of claim 1, wherein the first scaling factor is equal to the inverse of the second scaling factor.

10. The method of claim 1, wherein the first scaling factor is adjusted to result in a gap between the dental restoration to be hardened arranged on the physical testing model and the physical testing model, the thickness of the gap being further configured for receiving a pressure sensitive material between the dental restoration to be hardened and the physical testing model, the pressure sensitive material being configured to indicate pressure points being used for determining sections of the dental restoration to be hardened requiring adjusting to improve the fitting of the dental restoration to be hardened onto the physical testing model.

11. The method of claim 1, wherein the second scaling factor is equal to a shrinking factor quantifying a predicted shrinking of the size of the dental restoration to be hardened due to the hardening.

12. The method of claim 1, wherein the second scaling factor comprises a restoration-specific scaling factor assigned to the individual dental restoration, the physical testing model being a restoration-specific physical testing model for testing a specific dental restoration.

13. The method of claim 1, wherein the hardening of the dental restoration comprises sintering.

14. The method of claim 1, further comprising receiving the first scaling factor by one of the following: by receiving the first scaling factor as an input, by receiving the first scaling factor as a scan result provided by a scanner configured for scanning a code comprising the first scaling factor.

15. The method of claim 1, further comprising receiving the second scaling factor and calculating the first scaling factor using the second scaling factor, the second scaling factor being received by one of the following: by receiving the second scaling factor as an input, by receiving the second scaling factor as a scan result provided by a scanner configured for scanning a code comprising the second scaling factor.

16. The method of claim 1, further comprising providing a first library of restoration materials, each of the restoration materials being assigned with at least one of the following scaling factors: a restoration material specific first scaling factor, a restoration material specific second scaling factor,
the method further comprising:
selecting one of the restoration materials to be used for manufacturing the dental restoration,
using a scaling factor assigned to the selected restoration material for scaling the 3D digital testing model.

17. The method of claim 16, wherein the individual restoration materials each being assigned with a plurality of scaling factors, the scaling factors assigned to the individual restoration materials being restoration type specific scaling factors,
the method further comprising selecting in addition to one of the restoration materials a restoration type depending on the type of dental restoration for which the physical testing model is to be provided, the scaling factor used for scaling the 3D digital testing model being a scaling factor assigned to the selected restoration material and specific for the selected restoration type.

18. The method of claim 16, wherein the individual restoration materials each being assigned with a plurality of scaling factors, the scaling factors assigned to the individual restoration materials being hardening process specific scaling factors,
the method further comprising selecting in addition to one of the restoration materials a hardening process to be used for hardening the dental restoration to hardened, the scaling factor used for scaling the 3D digital testing model being a hardening process specific scaling factor assigned to the selected restoration material and specific for the selected hardening process.

19. The method of claim 1, further comprising a second library of restoration types, each of the restoration types being assigned with one or more adjustment parameters for a restoration type specific adjusting of the first scaling factor,
the method further comprising:
selecting one of the restoration types depending on the type of dental restoration for which the physical testing model is to be provided,
using the one or more adjustment parameters assigned to the restoration type for adjusting the first scaling factor used for scaling the 3D digital testing model to the type of dental restoration for which the physical testing model is to be provided.

20. The method of claim 1, further comprising using a trained machine learning module for scaling the size of the 3D digital model of the dental element,
the trained machine learning module being configured to provide the 3D digital testing model as output in form of the 3D digital model of the dental element scaled using the first scaling factor in response to receiving the 3D digital model of the dental element and an identifier of a restoration material, to be used for manufacturing the dental restoration, as input.

21. The method of claim 20, further comprising providing the trained machine learning module, the providing of the trained machine learning module comprising:
providing a machine learning module to be trained,
providing a set of training datasets for training the machine learning module to be trained, each training dataset comprising a 3D digital training model of a dental training element, a training identifier of a restoration material and a 3D digital training testing model, training the machine learning module to be trained to provide the 3D digital training testing models of the training datasets as output in response to receiving the 3D digital training model of the dental training element and the training identifier of the restoration material of the respective training datasets as input.

22. The method of claim 21, wherein each of the training datasets further comprises one or more training process parameters of hardening processes, for each of the training datasets the one or more training process parameters of the respective training dataset being additionally provided as input for training the machine learning module to be trained, the resulting trained machine learning module being configured for additionally taking into account one or more process parameters of a hardening process to be used for hardening the dental restoration to hardened as input for providing the 3D digital testing model as output, wherein the one or more training process parameters comprise one or more of a temperature applied, a pressure applied, a duration of time, over which one or more of a specific temperature and a specific pressure is applied in a hardening process.

23. The method of claim 21, wherein each of the training datasets further comprises a 3D digital training dental restoration model, for each of the training datasets the 3D digital training dental restoration model of the respective training dataset being additionally provided as input for training the machine learning module to be trained, the resulting trained machine learning module being configured for additionally taking into account a 3D digital dental restoration model as input for providing the 3D digital testing model as output.

24. The method of claim 1, wherein the one or more fitting criteria further comprises one or more of the following: an arrangeability of the dental restoration to be hardened at a predefined position on the physical testing model, an adjustability of the dental restoration to be hardened on the physical testing model with a predefined orientation relative to the physical testing model, a provision of a gap between the dental restoration to be hardened and physical the testing model, when the dental restoration to be hardened is arranged at the predefined position on the physical testing model with the predefined orientation, with the gap having a thickness within a predefined range of thicknesses.

25. The method of claim 1, wherein the dental element comprises one of the following: a tooth prepared for receiving the dental restoration, a tooth stump prepared for receiving the dental restoration, an abutment configured for receiving the dental restoration.

26. The method of claim 1, wherein the dental restoration comprises one of the following: a crown, a bridge, a veneer, an inlay, an onlay, an overlay.

* * * * *